United States Patent
Donahue et al.

(10) Patent No.: US 11,394,782 B2
(45) Date of Patent: Jul. 19, 2022

(54) FLIGHT MANAGEMENT SYSTEMS AND METHODS

(71) Applicants: Daniel Donahue, Madison, AL (US); James McKean, Potomac, MD (US)

(72) Inventors: Daniel Donahue, Madison, AL (US); James McKean, Potomac, MD (US)

( * ) Notice: Subject to any disclaimer, the term of this patent is extended or adjusted under 35 U.S.C. 154(b) by 68 days.

(21) Appl. No.: 16/686,179

(22) Filed: Nov. 17, 2019

(65) Prior Publication Data

US 2021/0176316 A1    Jun. 10, 2021

(51) Int. Cl.
| | |
|---|---|
| *H04L 67/12* | (2022.01) |
| *H04L 9/40* | (2022.01) |
| *H04L 43/0805* | (2022.01) |
| *H04L 69/16* | (2022.01) |

(52) U.S. Cl.
CPC .......... *H04L 67/12* (2013.01); *H04L 43/0805* (2013.01); *H04L 63/0209* (2013.01); *H04L 63/0227* (2013.01); *H04L 69/16* (2013.01)

(58) Field of Classification Search
CPC ............ G09B 19/0053; H04L 63/1416; H04L 63/1483
See application file for complete search history.

(56) References Cited

U.S. PATENT DOCUMENTS

| | | | |
|---|---|---|---|
| 7,581,002 B2 | 8/2009 | Royalty | |
| 7,640,451 B2 | 12/2009 | Meyer | |
| 8,458,793 B2 | 6/2013 | McKenna | |
| 8,612,639 B1 * | 12/2013 | Righi | G06F 11/143 |
| | | | 710/15 |

(Continued)

OTHER PUBLICATIONS

Randall K. Nichols, Unmanned Aircraft Systems (UAS) in the Cyber Domain: Protected USA's Advanced Air Assets, NPP eBooks, Sep. 14, 2018, i-xlix and 1-509, NPP eBooks, 21, New Prairie Press, published on the Internet.

(Continued)

*Primary Examiner* — Chris Parry
*Assistant Examiner* — Steven C Nguyen
(74) *Attorney, Agent, or Firm* — Dennen IP Law, LLC

(57) ABSTRACT

A flight management system of the present disclosure has an internal network that uses an open architecture concept with no single point of failure of critical system and which is cyber secure for aviation assets. A flight management system of the present disclosure comprises an internal network operating on an aircraft, and the internal network communicatively coupled to an external network via a firewall. The flight management system further has a primary system installed on the aircraft, which is initially active, and the primary system has a first weapons domain communicatively coupled to the internal network, a first flight domain communicatively coupled to the internal network, and a first communications domain communicatively coupled to the internal network. The flight management system also has a mirror system installed on the aircraft, which is initially inactive, and the mirror system has a second weapons domain communicatively coupled to the internal network, a second flight domain communicatively coupled to the internal network, and a second communications domain communicatively coupled to the internal network. Furthermore, the flight management system has a monitoring system separate from the primary system and the mirror system and communicatively coupled to the internal network, and the monitoring system has a processor. The processor monitors, over the internal network, the first weapons domain, the first flight domain, and the first communications domain while active. The processor reboots, over the internal network, the first weapons domain, the first flight domain, or the first communications domain if the first weapons domain, the first flight domain, or the first communications domain change state and the processor activates the second weapons domain if the first weapons domain is rebooted, activates the second flight domain if the first flight domain is rebooted, or (Continued)

activates the second communications domain if the first communication domain is rebooted.

20 Claims, 12 Drawing Sheets

(56) References Cited

U.S. PATENT DOCUMENTS

| | | |
|---|---|---|
| 9,171,167 B2 | 10/2015 | Ayyagari et al. |
| 9,178,897 B2 | 11/2015 | Bush |
| 9,591,009 B2 | 3/2017 | Craig et al. |
| 2008/0244743 A1 | 10/2008 | Largman |
| 2011/0035149 A1* | 2/2011 | McAndrew .......... G05D 1/0038 |
| | | 701/466 |
| 2014/0157041 A1* | 6/2014 | Danielsson ......... G06F 11/2043 |
| | | 714/4.2 |
| 2016/0340055 A1* | 11/2016 | Floyd ................. B64D 45/0015 |
| 2018/0373866 A1* | 12/2018 | Sweeney ............. H04L 63/1425 |
| 2021/0019403 A1* | 1/2021 | Mehta ...................... G06N 3/08 |

OTHER PUBLICATIONS

United States Government Accountability Office, Weapon Systems Cybersecurity DOD Just Beginning to Grapple with Scale of Vulnerabilities, Report to the Committee on Armed Services, U.S. Senate, Oct. 2018, pp. 1-44, published on the Internet.

\* cited by examiner

FLIGHT MANAGEMENT SYSTEMS AND METHODS

BACKGROUND

In today's aircraft, there are often three separate technical domains, including a flight domain, a weapons domain, and a communications domain. Each domain comprises a server consisting of hardware and software, and the servers are networked together so that each domain can bi-directionally communicate with the other domains. The domains typically represent all the technology necessary to fly the aircraft. Note that the three domains may, in some circumstances, be on a single server in a typical aircraft but functionally separate.

Each domain may receive data from sources external to the aircraft via a network, e.g., data from an air traffic controller system. Further, the domains communicate between each other. That is, the communications domain may bi-directionally communicate with the weapons domain and the flight domain. The weapons domain may bi-directionally communicate with the communications domain and the flight domain, and the flight domain, under some limited circumstances, may bi-directionally communicate with the weapons domain and the communications domain.

The flight domain controls the actual flight of the aircraft, and the flight domain is the most essential domain. It receives and transmits data necessary for flying the aircraft. In this regard, it may control any subsystem that causes the aircraft to climb, descend, turn left, turn right, bank left, bank right, pitch, roll or yaw. If the aircraft is breaking gravity to go from point A to point B, the flight domain controls such scenario. Note that communication with the flight domain is limited to only data needed to fly the aircraft.

The weapons domain is any type of weapons solution that uses computer processing. For example, the weapons domain may control precision guided rockets, Hellfire missiles, a thirty-millimeter chain guns, or any future weapons and offense and defense capabilities. Often there is some communication between the communications domain and the weapons domain and the flight domain to create a firing solution. The data received by the weapons domain may represent a global positioning system (GPS) signal, and using triangulation, the weapons domain determines control of the weapons to hit a particular target.

The communications domain is the main transceiver of the system. In this regard, information that is received from an external source is typically received by the communications domain. Once received, the communications domain determines to which domains the information should be disseminated. For example, the communications domain may receive a GPS signal that identifies a location of the aircraft. The communication domain would route this data indicative of the GPS signal received to the flight domain. The flight domain uses the data indicative of the signal to fly the aircraft.

Notably, the domains are communicatively coupled to an external network. It is possible for hackers to access the servers of the domains externally. Such a scenario would necessarily cause a potential flight risk to the aircraft.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1A:
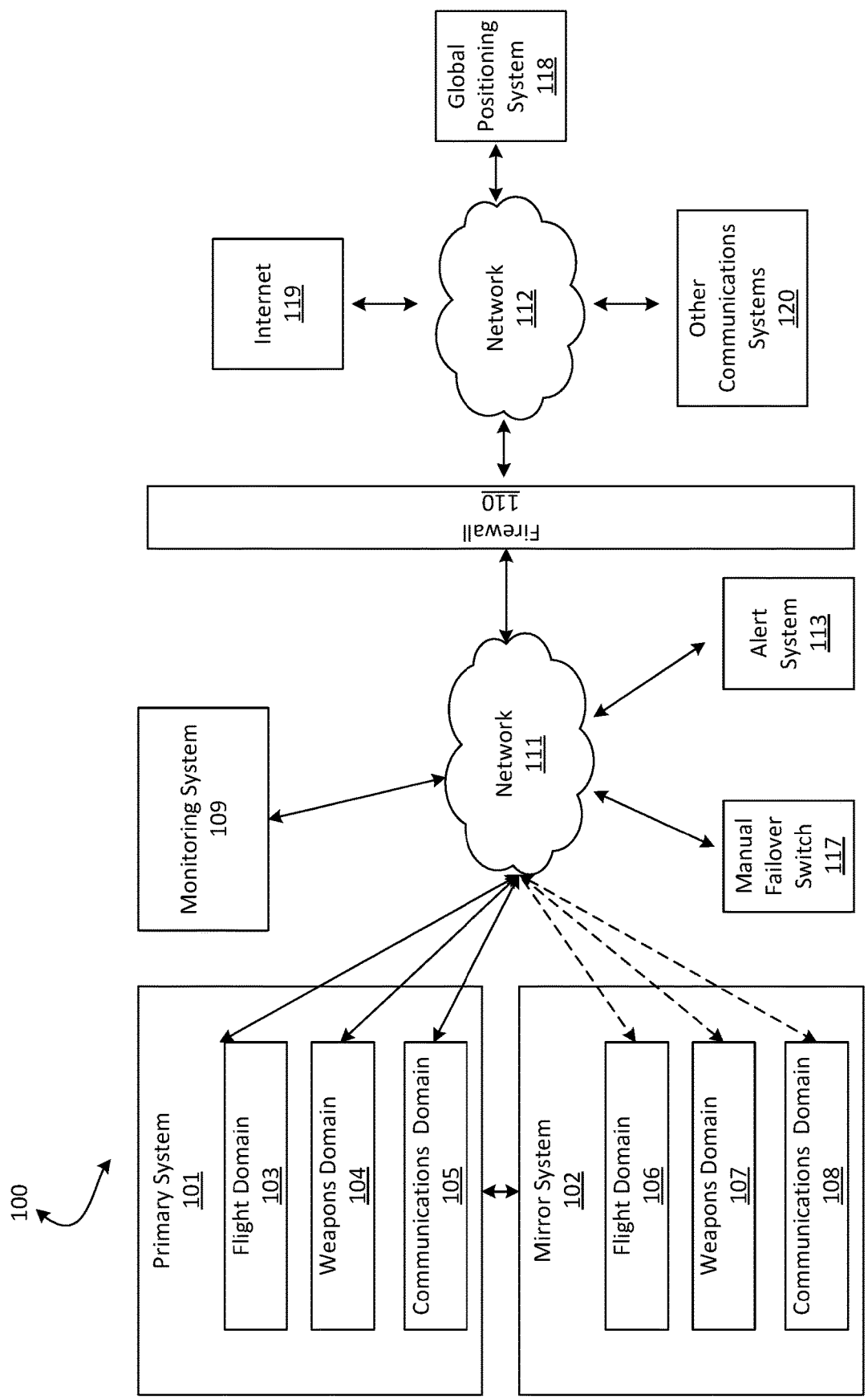
FIG. 1A is a block diagram of an exemplary flight management system installed on an aircraft in accordance with an embodiment of the present disclosure.

The present disclosure describes an exemplary flight management system installed on an aircraft. The exemplary flight management system in accordance with an embodiment of the present disclosure identifies, reacts to and defeats cyber security threats. In this regard, the flight management system comprises a primary system and a mirror system. The mirror system is an exact replica of the primary system. The domains have configuration lockdown of file count, file size, existing source code and system state.

The primary system and the mirror system of the exemplary flight management system each comprise three domains, including a flight domain, a weapons domain, and a communications domain. Each of the domains communicates through a firewall with external data sources. Further, the domains intra-communicate through an internal firewall. That is, the flight domain bi-directionally communicates with the weapons domain and the communications domain, the weapons domain bi-directionally communicates with the flight domain and the communication domain, and the communications domain bi-directionally communicates with the flight domain and the weapons domain. In one embodiment, the bi-directional communication between the domains is done through an internal firewall.

In one embodiment, the flight domain controls the actual flight of the aircraft, and the flight domain is the most essential domain. It receives and transmits data necessary for flying the aircraft. In this regard, it may control any subsystem that causes the aircraft to climb, descend, turn left, turn right, bank left, bank right, pitch, roll or yaw. If the aircraft is breaking gravity to go from point A to point B, the flight domain controls such scenario. Note that communication with the flight domain is limited to only that data needed to fly the aircraft. In this regard, communication with the flight domain is often limited to communication with the communications domain.

In one embodiment, the weapons domain is any type of weapons solution that uses computer processing. For example, the weapons domain may control precision guided rockets, Hellfire missiles, a thirty-millimeter chain guns, or any future weapons and offense/defense capabilities. Often there is some communication between the communications domain and the weapons domain and the flight domain to create a firing solution. The data received by the weapons domain may represent a global positioning system (GPS) signal, and using triangulation, the weapons domain determines control of the weapons to hit a particular target.

In one embodiment, the communications domain is the main transceiver of the system. In this regard, information that is received from the external source is typically received by the communications domain. Once received, the communications domain determines to which domains the information should be disseminated. For example, the communications domain may receive a GPS signal that identifies a location of the aircraft. The communication domain would route this data indicative of the GPS signal received to the flight domain. The flight domain uses the data indicative of the signal to fly the aircraft.

Each domain is technically a distinct and functioning entity. In one embodiment, each domain is comprised of a server, including hardware and software, for performing the domains' functions. Further, each domain has a hard drive, and the hard drive write capability is turned off. Additionally, each hard drive comprises encryption software to protect the primary and mirror systems. There is a firewall between the domains that blocks all Internet protocol (IP) addresses and ports except for the reception of specific data and metadata. Only specific data and metadata can flow between the domains' firewall. Notably, data and metadata are domain Specific.

The flight management system receives data from the external source through the firewall. The flight management system vets the data received to determine if the data is from a trusted source and doesn't comprise data that would compromise the aircraft if the data is disseminated to one of the domains. Further, the fight management system determines to which domain the data should be routed, based upon the data received. The flight management system routes the data to a particular domain, based upon the data received. Notably, data may be communicated from one domain to the other. In this regard, the flight management system comprises a firewall between each domain, and the flight management system vets the data transmitted between the domains to ensure that the data is from a trusted source and doesn't comprise data that would compromise the aircraft.

During operation, a monitoring system of the flight management system periodically examines an operating environment of each domain. The monitoring system will continually monitor the hard drives and system states of the domains to determine if there have been any updates to the existing source code, file count, file size or other characteristic. The monitoring system continuously monitors, diagnoses and locks down the file count, file size, existing source code, system state, cache state.

The flight management also provides for manual or automatic failover from an operating domain to a mirrored standby domain. When the monitoring system finds a mismatch in either count or size of a domain it switches the to its mirrored counterpart on the mirror system. After the switch, the monitoring system recycles the affected domain. In cycling the affected domain, the affected domain returns to its original state. The mirrored domain becomes the operational domain until a failover occurs.

Also, if changes to the source code occur, the monitoring system will transmit data to the domain affected in the primary system to reboot the domain. Further, the monitoring system will transmit data to the replica domain of the affected domain to turn on the mirrored domain of the replica domain. Once the primary server domain has been cycled, the monitoring device transmits a signal to the domain on the primary that was affected to turn back on, and the domain on the mirror system returns to standby domain to which there was failover will continue to be the primary domain until another failover occurs.

The monitoring system may compare data indicative of a known file count, a known file size, or a known system state to data corresponding to each domain. If the monitoring system detects that the file count, the file size or the system state of a particular domain has changed, the monitoring system transmits a signal to the active domain to reboot, and the monitoring system transmits a signal to the inactive domain to begin operating in place of the domain being rebooted.

FIG. 1A is a block diagram of an exemplary flight management system 100 in accordance with an embodiment of the present disclosure. The flight management system 100 comprises a primary system 101 and a mirror system 102. The primary system 101 and the mirror system 102 are installed on an aircraft (not shown). The mirror system 102 is an exact replica of the primary system 101. That is, hardware, software, and data are identical to the primary system 101.

The primary system 101 comprises a flight domain 103, a weapons domain 104, and a communications domain 105, described hereinabove. Each of the flight domain 103, weapons domain 104, and communications domain 105 can bi-directionally communicate one with the other over an internal network 111. In one embodiment, the internal network 111 is a local area network (LAN); however, other types of networks are possible in other embodiments of the present disclosure. In one embodiment, each domain 103-105 comprises a processor (not shown), memory (not shown) storing software executed by the processor, and the domain may comprise other software and hardware.

The mirror system 102 is an exact replica of the primary system 101, as described above. The mirror system 102 also comprises a flight domain 106, which is an exact replica of flight domain 103, a weapons domain 107, which is an exact replica of the weapons domain 104, and a communications domain 108, which is an exact replica of the communications domain 105. In operation, each of the flight domain 106, weapons domain 107, and communications domain 108 can bi-directionally communicate one with the other over an internal network 111. In one embodiment, each domain 106-108 comprises a processor (not shown), memory (not shown) storing software executed by the processor, and the domains may contain other hardware (not shown).

During normal operation, the domains 103-105 of the primary system 101 are active. That is, the flight domain 103, the weapons domain 104, and the communications domain 105 are enabled and are performing their respective functions. Further, the mirror system 102 preserves a system state of the primary server 101. However, the mirror system 102 is normally not active, i.e., the mirror system 102 is disabled.

On the primary system 101, the ability to write to a hard drive (not shown) of the primary system 101 is disabled, and a setting on the primary system 101 indicates that if the primary system 101 is restarted, the primary system 101 loses its cache and returns to its normal system state. Note that cache refers to memory that a processor can access quicker than hard drive memory or regular random access-memory (RAM), e.g., static RAM.

During normal operation, the domains 106-108 of the mirror system 102 are inactive and are on standby. Further, on the mirror system 102, the ability to write to a hard drive of the mirror system 102 is disabled, and a setting on the mirror system 102 indicates that if the mirror system 102 is restarted, the mirror system 102 loses its cache and returns to its normal system state.

The flight management system 100 further comprises a firewall 110 communicatively coupled to an external network 112. The firewall 110 transmits data to external sources and receives data from external sources via the external network 112. In one embodiment, the data comprises metadata, which is data that describes and gives information about the other received data. The firewall 110 blocks all internet protocol (IP) addresses and ports except specific those IP addresses and ports that comprise data and metadata for use by the flight domain, the weapons domain, and the communications domain.

The firewall 110 communicates with the external sources, e.g., 118-120, using a typical internet protocol. In one embodiment, this typical network protocol is transmission control protocol/internet protocol (TCP/IP). In such an embodiment, the firewall receives data and/or metadata from the external sources 118-120 in TCP/IP. The TCP/IP data and/or metadata received from the external sources 118-120 is considered "routable" data and/or metadata. However, the firewall 110 does not transmit the TPC/IP protocol data and/or metadata through the network 111 because transmission of TCP/IP protocol data and/or metadata through the network to the domains 103-108 may compromise the integrity of the domains 103-108.

Accordingly, the firewall 110 performs a translation operation on the received TCP/IP data and/or metadata received from the external sources 118-120. In this regard, the firewall translates the received TCP/IP data and/or metadata into a non-routable protocol. A "non-routable protocol" is any type of data packet for transmission that comprises only a device address and the data and/or metadata to be transmitted. The non-routable protocol does not comprise a network address, so the data and/or metadata cannot be transmitted from one network to another. Thus, the firewall 110 blocks the free flow of routable information to network 111. This helps to ensure that the network 111, the domains 103-108, and the monitoring system 109 are not accessible via the network 112 without translation by the firewall 110.

In one embodiment, the external sources may be an Internet 119, a global positioning system (GPS), or other communications systems 118. The firewall 119 communicates with the domains 103-105 and/or 106-108 of the primary system 101 or the mirror system 102, respectively, whichever domains 103-105 and/or 106-18 are active, over the network 111. Note that the communications domains 105 and 108 oftentimes function as a "gatekeeper", when active, and route data received from the external sources to the flight domains 103 and 106, or the weapons domains 104 and 107, whichever domain is activated. In this regard, the firewall 119 sends and receives data and metadata inside the firewall 119. The firewall 119 sends specific metadata to the flight domain, weapons domain, and the communications domain. Importantly, the firewall 119 cannot send data or metadata to a monitoring system 109 on the network 111.

As indicated, the flight management system 100 further comprises the monitoring system 109. The monitoring system 109 communicates with each active domain 103-105 or 106-108 during operation via the internal network 111, depending upon which domains are active. The monitoring system 109 periodically or continuously monitors the active domains 103-105 and/or 106-108 and performs diagnostics on the active domains 103-105 and/or 106-108.

In monitoring, the monitoring system 109 comprises state data including, for example, data indicative of the domains' hard drive file counts, file sizes and system or cache states. If the monitoring system 109 determines that the hard drive file count and file size of one of the active domains 103-105 and/or 106-108 have changed, the monitoring system 109 transmits a signal to the active domain 103-105 and/or 106-108 to restart. Further, the monitoring system 109 transmits a signal to the mirrored inactive domain 103-105 and/or 106-108 to activate, respectively. That is, if the flight domain 103 is deactivated, the flight domain 106 activates, if the weapons domain 104 is deactivated, the weapons domain 107 activates, and if the communications domain 105 is deactivated, the communications domain 108 is activated. In this sense, when an undesirable activity is detected on a domain, the domain that is a mirror copy of the domain with the undesirable activity takes over operation.

The monitoring system 109 may further monitor the dates and/or version numbers of files on an active domain's hard drive. If the monitoring system 109 determines that a file has an incorrect date or a version number, the monitoring system 109 transmits a signal to the active domain 103-105 and/or 106-108 to restart. Further, the monitoring system 109 transmits a signal to the mirrored inactive domain 103-105 and/or 106-108 to activate, respectively.

Note that each domain 103-105 and 106-108 may separately failover. That is, if monitoring system 109 determines that there is a problem with the flight domain 103 of the primary system 101, the monitoring system 109 can failover to the flight domain 106 of the mirror system 101, and the weapons domain 104 and the communications domain 105 on the primary system 101 remain operational. Thus, the flight domain 106 of the mirror system 101 becomes primary. In another scenario, two domains may failover or all three may failover. Regardless, the mirror system domain(s) 106-108 become the primary domain(s) 106-108. The primary system domain(s) 103-105 that are restarted reboot to their normal system state and become the mirror domain(s) 103-105. This can occur per domain. Thus, which domain 103-105 or 106-108 may each separately be active regardless of which system they are associated with.

The flight management system 100 further comprises an alert system 113. The alert system 113 receives data from the monitoring system 109 via the internal network 111. Data received from the monitoring system 109 may indicate that a failover to one or all the domains of the mirror system 102 from the primary system 101 has occurred. The alert system 113 then alerts the aircrew in the cockpit flying the aircraft that a failover has occurred via one or more output devices (not shown). For example, an output device may be a liquid crystal display, a light, or a speaker for audible warnings or alerts.

If a failover in one of the primary system domains 103-105 or 106-108 occurs, the monitoring system 109 transmits a signal to the alert system 113. The alert system 113 notifies the aircrew in the cockpit that a failover has occurred. If a failover occurs only once, the aircrew can choose to continue flying the mission. If a failover occurs a second time, the aircrew can choose to land as soon as practical. If a failover occurs a third time, the aircrew can choose to land as soon as possible.

The flight management system 100 further comprises a manual failover switch (not shown). The manual failover switch may be a in a cockpit (not shown) of the aircraft. If the aircrew determines from his/her instruments that there is a problem in flight, the aircrew can actuate a manual failover switch 117. The manual failover switch 117 may be hardware, software, or a combination thereof. When actuated, the manual failover switch indicates to the primary system 101 to disable itself, e.g., turn off, and indicates to the mirror system 102 to enable itself, e.g., turn on.

Figure 1B:
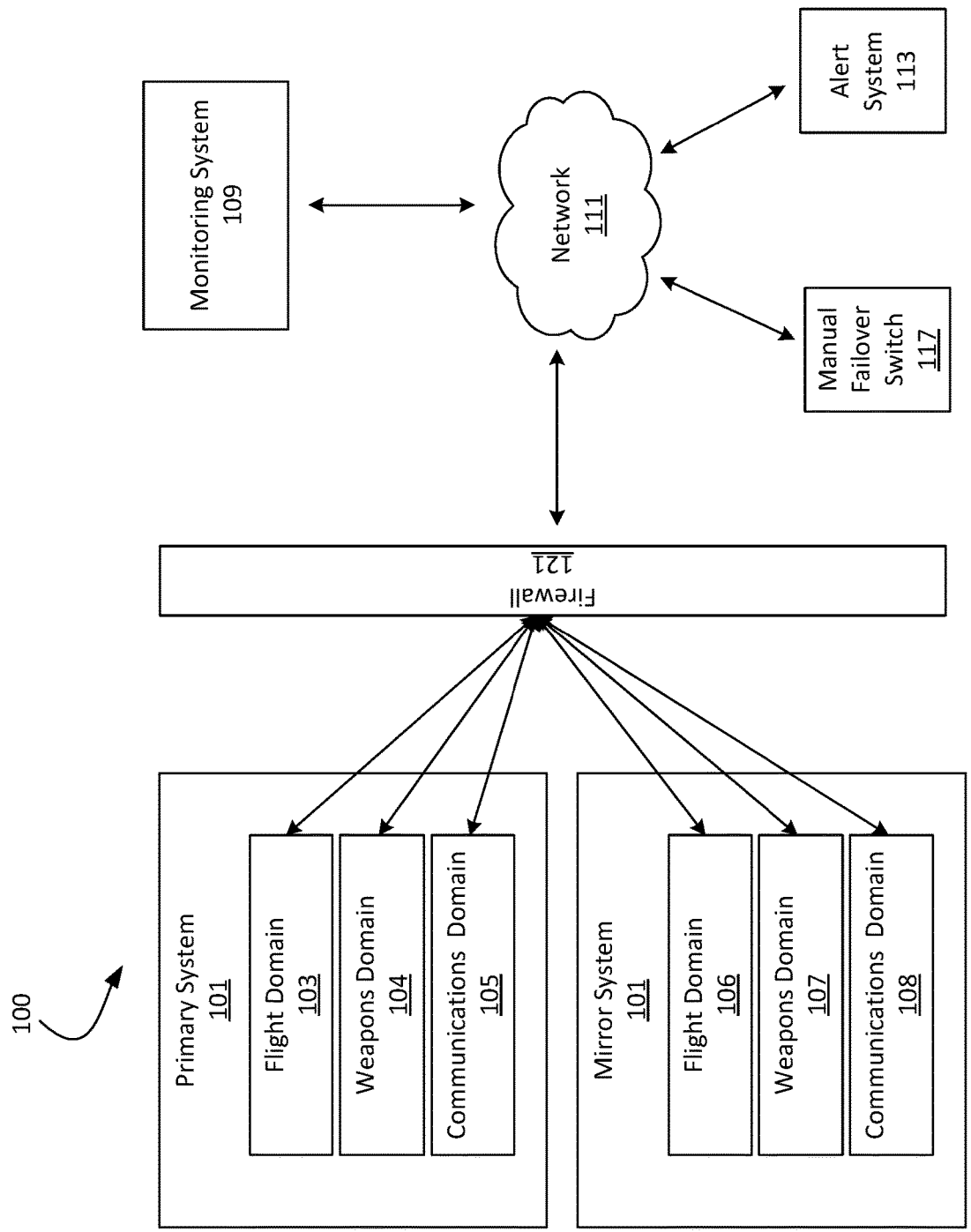
FIG. 1B is a block diagram of a portion of the system installed on the aircraft as shown in FIG. 1A.

FIG. 1B is a block diagram of is a block diagram of a portion of the flight management system 100 installed on the aircraft as shown in FIG. 1A. The flight management system 100 further comprises an internal firewall 121. The internal firewall 121 is communicatively coupled to the monitoring system 109, the alert system 113, and the manual failover switch 117 via the network 111. In addition, each domain 103-105 of the primary system 101 and each domain 106-108 of the mirror system 101 are separately communicatively coupled to the network 111 through firewall 121, and each of the domains 103-105 and 106-108 are communicatively coupled one to the other through the internal firewall 121. The firewall 121 between the domains 103-105 and 106-108 only allows specific data and metadata to be transmitted to/from the domains 103-105 and 106-108, and the data and metadata being transmitted between the domains 103-105 and 106-108 is domain specific In one embodiment, the system 100 uses open architecture when deploying the flight domains 103 and 106, the weapons domains 104 and 107, and the communications domains 105 and 108. In this regard, open architecture of the domains 103-105 and 106-108 makes adding, upgrading, and swapping components easy. In such an embodiment, the open architecture system 100 may use a standardized system bus or they may incorporate a proprietary bus standard with up to a dozen slots that allow multiple hardware manufacturers to produce add-ons, and for the user to freely install them. Computer platforms may include systems with both open and closed architectures. As an example, the Macintosh (Mac) mini and Mac employ closed architecture. The Mac II and Power Mac G5 employ open architecture. Most desktop personal computers (PCs) employ open architecture, but nettops are typically closed.

Also, the open architecture of the system 100 enable a user (not shown) to add software modules. For example, open application programming interfaces (API) to domains 103-105 and 106-108 allow the functionality of the domains 104-105 and 106-108 to be modified or extended.

In another embodiment, the open architecture consists of the messages that can flow between the domains 103-105 and 106-108. These messages may have a standard structure that can be modified or extended based upon circumstances or need.

In one embodiment, the domains 103-105 and domains 106-108 employ cyber security architecture. In this regard, each domain comprises logic that identifies attacks, protects the domains 103-105 and 106-108, and detects and responds to threats. In an embodiment of the present disclosure, the logic may be hardware, software, firmware, or a combination thereof. In this regard, the monitoring system 109 comprises the cyber-security software (not shown). The software may be a script that is executed by the monitoring system 109, e.g., a shell script. The shell script may execute, for example, every second. The script queries each of the domains 103-105 and 106-108 to obtain a list of all files and a size of all the files on the domains 103-105 and 106-108. The script compares a previous list of all the files and the sizes of all the files with the current list of files and the size of all the files to determine if there has been a change seen the previous query. If there is a difference between the previous file and the current file, the monitoring system executes a failover of the domain(s) where there is a difference between the previous file and the current file. Note that a failover means that a primary domain reboots and a domain that mirrors the primary domain begins to operate. For example, if the communications domain 105 transmits data to the flight domain 103, the communications domain 105 transmits the message through the firewall 121, which forwards the message to the flight domain 103. Note that the communications domains 105 and 108 often serve as a "gatekeeper," and receives messages through the internal firewall from network 111 that are ultimately destined for the flight domain 103 and 106, whichever is activated, or the weapons domains 104 and 107, whichever is activated.

As described, each of the domains 103-105 and 106-108 is communicatively coupled to the other domains 103-105 and 106-108 through the firewall 121. In this regard, the domains 103-105 and 106-108 intra-communicate. That is, the flight domain 103 bi-directionally communicates with the weapons domains 104 and 107, whichever is activated, and the communications domains 105 and 108, whichever activated, the weapons domain 104 bi-directionally communicates with the flight domains 103 and 106, whichever is activated, and the communication domains 105 and 108, whichever is activated, and the communications domain 105 bi-directionally communicates with the flight domains 103 and 106, whichever is activated, and the weapons domains 104 and 107, whichever is activated. In one embodiment, the bi-directional communication between the domains is done through the internal firewall 121.

In one embodiment, the firewall vets the data and/or metadata received to determine if the data is from a trusted source and doesn't comprise data that would compromise the aircraft if the data is disseminated to one of the domains 103-105 and/or 106-108. Further, the firewall 121 determines to which domain 103-105 or 106-108 the data should be routed. In this regard, the data received that is to be routed to a particular domain 103-105 or 106-108 may comprise an identifier identifying the domain 103-105 or 106-108 for which the message is intended. Alternatively, the communications domains 105 and 108 may know, based on the data and which domains 103-105 and 106-108 are active, to which domain to send the data and/or metadata. Thus, the firewall 121 routes the message or data to a particular domain 103-105 or 106-108, based upon the identifier contained in the data received or its analysis of the data and/or metadata. Notably, the firewall 121 vets the message or data transmitted between the domains to ensure that the message or data is from a trusted source and doesn't comprise data that would compromise the aircraft.

Figure 2:
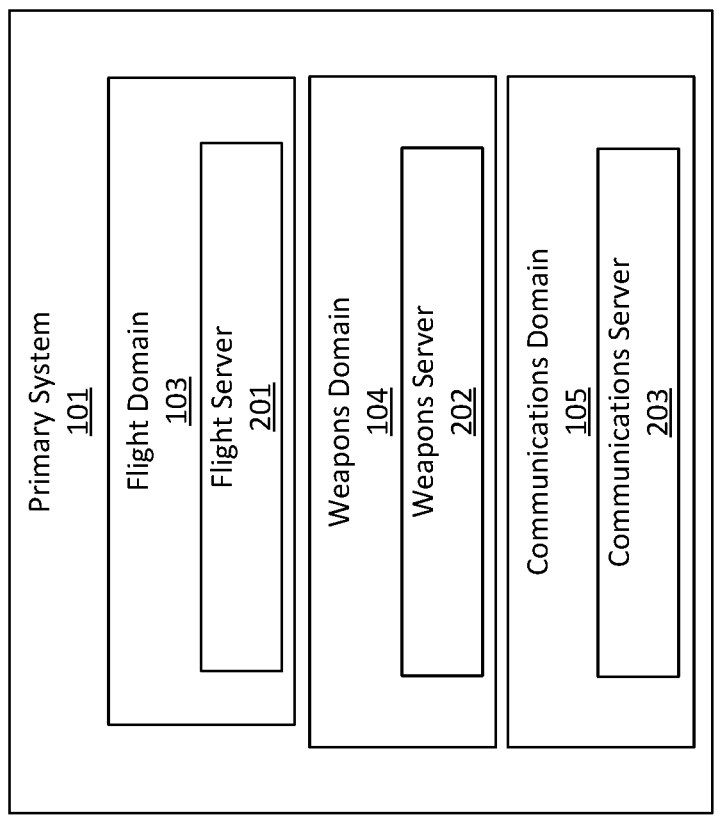
FIG. 2 is a block diagram of an exemplary primary system as shown in FIG. 1A installed on the aircraft.

FIG. 2 is a block diagram depicting the primary system 101. As described hereinabove, the primary system 101 comprises a flight domain 103, a weapons domain 104, and a communications domain 105. The domains 103-105 of the primary server 101 intra-communicate. That is, during operation of the flight management system 100 (FIG. 1), the flight domain 103 bi-directionally communicates with the weapons domain 104 and the communications domain 105, the weapons domain 103 bi-directionally communicates with the flight domain 103 and the communications domain 105, and the communications domain 105 bi-directionally communications with the flight domain 103 and the weapons domain 104.

In one embodiment, each domain 103-105 comprises a server 201-203 or other computing device. In this regard, the flight domain 103 comprises a flight server 201. The weapons domain comprises a weapons server 202, and the communications domain 105 comprises a communications server 203. Note that in another embodiment the flight domain 103, the weapons domain 104, and the communications domain 105 may be implemented on fewer or more servers in other embodiments. For example, a single server may house all domains, or each domain may have two or more dedicated servers.

As described above, the flight domain 103 controls the actual flight of the aircraft, and the flight domain 103 is the most essential domain. It receives and transmits data necessary for flying the aircraft. In this regard, it may control any subsystem that causes the aircraft to climb, descend, turn left, turn right, bank left, bank right, pitch, roll or yaw.

In one embodiment of the flight management system 100, the flight server 201 comprises hardware (not shown), including memory for storing software (not shown) and other data. The flight server 201 is configured to bi-directionally communicate with the weapons server 202 and the communications server 203 through the firewall 121 (FIG. 1B) or bi-directionally communicate with an external source through the network 112 (FIG. 1A) and the firewall 110 (FIG. 1A).

The hardware includes a hard drive (not shown) for storing control software and/or files and data for controlling flight of the aircraft. This data may include data indicative of changes to the state of the hard drive so that when the flight server 201 is rebooted when the flight server 201 is compromised, the flight server 201 can return to an initial state. The initial state means all data that may have been compromised is replaced with data that replicates the data initially on the flight server 201 prior to the compromise.

As described above, the weapons domain 104 controls any type of weapons solution implemented on the aircraft that uses computer processing. For example, the weapons domain may control precision guided rockets, Hellfire missiles, a thirty-millimeter chain guns, or any future weapons and offense/defense capabilities. It receives and transmits data necessary for controlling weapons (not shown) on the aircraft. In this regard, it may control any subsystem that causes the aircraft to locate a target and activate a weapon. For example, the weapons domain 104 may receive a signal from the communications domain 105 comprising data indicative of a location of the aircraft and the location of a target. Further, the weapons domain 104 may transmit data to a weapons subsystem to activate a weapon aimed at the target received in the data from the communications domain 105.

In one embodiment of the flight management system 100, the weapons server 202 comprises hardware (not shown), including memory for storing software (not shown) and other data. The weapons server 202 is configured to bi-directionally communicate with the flight server 201 and the communications server 203 through the firewall 121 (FIG. 1B) or bi-directionally communicate with an external source through the network 112 (FIG. 1A) and the firewall 110 (FIG. 1A). The hardware includes a hard drive (not shown) for storing control software and/or files and data for controlling weapon subsystems on the aircraft. This data may include data indicative of changes to the state of the hard drive so that when the weapons server 202 is rebooted when the weapons server 202 is compromised, the weapons server 202 can return to an initial state. The initial state means all data that may have been compromised is replaced with data that replicates the data initially on the weapons server 202.

As described above, the communications domain 105 domain is the main transceiver of the system. Information that is received from the external source is typically received by the communications domain 105 regardless of its ultimate destination. In this regard, the communications domain 105 often acts as a "gatekeeper" for receiving information and forwarding the data to one of the other domains, including the flight domain 103 and the weapons domain 104. Once data is received, the communications domain 105 determines to which domain, the flight domain 103 or the weapons domain 104, the data should be disseminated. For example, the communications domain may receive a GPS signal that identifies a location of the aircraft. The communication domain routes this data indicative of the GPS signal received to the flight domain 103. The flight domain 103 uses the data indicative of the signal to fly the aircraft.

In one embodiment of the flight management system 100, the communications server 203 comprises hardware (not shown), including memory for storing software (not shown) and other data. The communications server 203 is configured to bi-directionally communicate with the flight server 201 and the weapons server 202 through the firewall 121 (FIG. 1B) or bi-directionally communicate with an external source through the network 112 (FIG. 1A) and the firewall 110 (FIG. 1A). The hardware includes a hard drive (not shown) for storing control software and/or files and data for communicating with the other servers, including the flight server 201 and the weapons server 202. This data may include data indicative of changes to the state of the hard drive so that when the communications server 203 is rebooted when the communications server 203 is compromised, the communications server 203 can return to an initial state. The initial state means all data that may have been compromised is replaced with data that replicates the data initially on the communications server 203.

Figure 3:
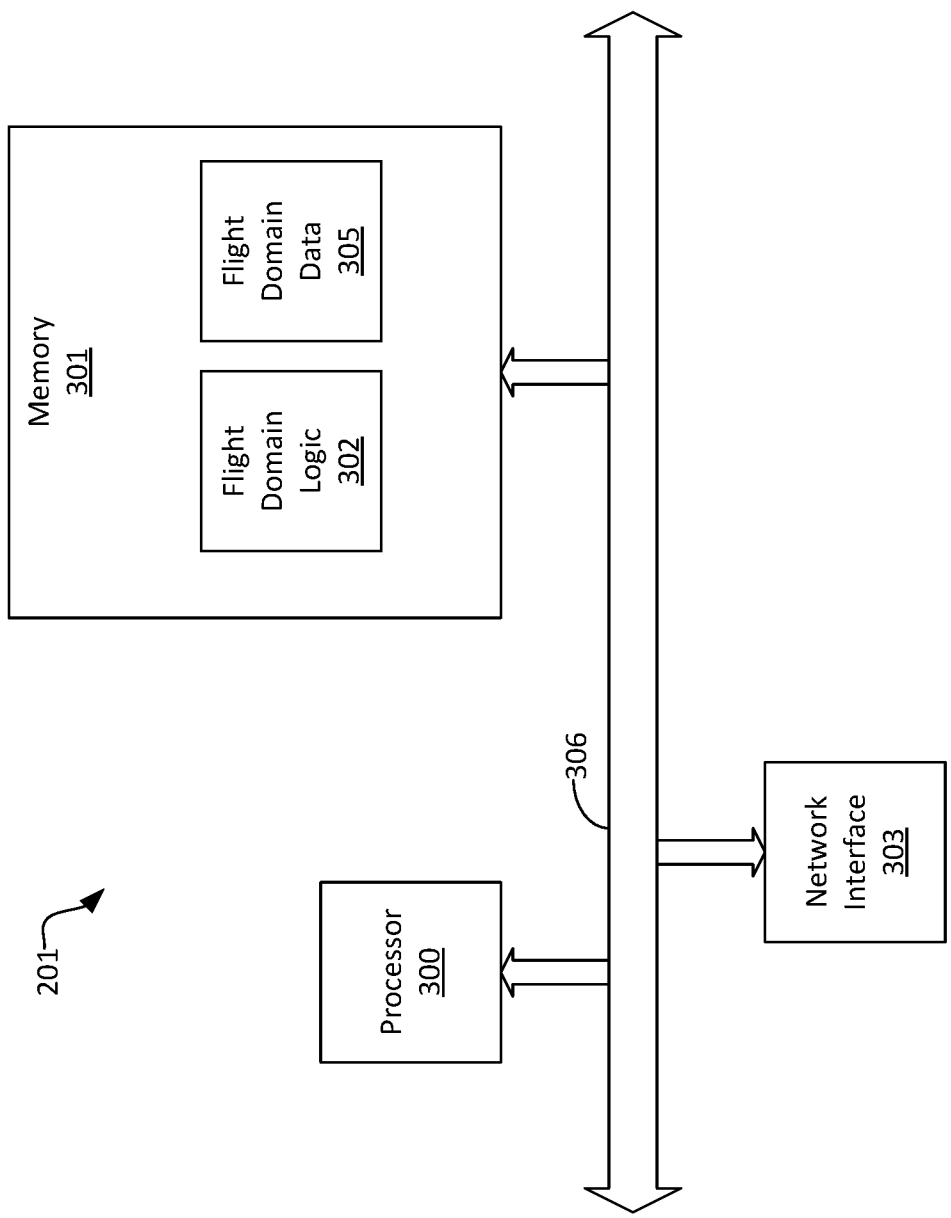
FIG. 3 is a block diagram of an exemplary flight server of the exemplary primary system as shown in FIG. 2.

FIG. 3 depicts an exemplary embodiment of the flight server 201 depicted in FIG. 2. The flight server 201 comprises a processor 300, a network interface 306, and memory 301. Stored in memory 301 is flight domain logic 302 and flight domain data 305.

Note that memory 301 is any type of memory known in the art and future developed. The memory 301 represents primary memory and secondary memory. For example, memory 301 may include primary memory, such as random-access memory (RAM) (not shown) or read only memory (ROM) (not shown). Additionally, the memory 301 may include secondary memory such as, a hard drive (not shown) or solid state storage or other storage devices (SD) (not shown). Memory 301 also include cache.

The exemplary embodiment of the flight server 201 depicted by FIG. 2 comprises at least one conventional processor 300, such as a Digital Signal Processor (DSP) or a Central Processing Unit (CPU), that communicates to and drives the other elements within the flight server 201 via a local interface 306, which can include at least one bus. Further, the processor 300 is configured to execute instructions of software, such as the flight domain logic 302.

The flight domain logic 302 generally controls the functionality of the flight server 601, as will be described in more detail hereafter. It should be noted that the flight domain logic 302 can be implemented in software, hardware, firmware or any combination thereof. In an exemplary embodiment illustrated in FIG. 3, the flight domain logic 302 is implemented in software and stored in memory 301.

Note that the flight domain logic 302, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The flight domain logic 302 controls flight of the aircraft (not shown), which is described herein. In this regard, the flight domain logic 302 transmits data necessary for flying the aircraft to flight subsystems of the aircraft. Further, the flight domain logic 302 may receive data from flight subsystems that the flight domain control logic 302 uses to fly the aircraft. Notably, the flight domain logic 302 may control any subsystem that causes the aircraft to climb, descend, turn left, turn right, bank left, bank right, pitch, roll or yaw.

The flight domain data 305 is any data accessible by the flight domain logic 302, which enables the flight domain logic 302 to control flight of the aircraft. Further, the flight domain data 305 may be any data that can be used by the flight domain logic 302 to reboot the flight server 201 when the flight server 201 is compromised. Also, the flight domain data 305 comprises data about the flight server 201, including file count, file size, or other data related to system state.

The network interface 306 is any type of network interface that allows the flight domain control logic 302 to communicate with the network 111 (FIG. 1B) through the firewall 121 (FIG. 1). Through the network interface 306, the flight domain logic 302 can communicate with the weapons server 202 or the communications server 203. Through the network interface 306, the flight domain logic 302 can also communicate with the domains 106-108 on the mirror system 102. Also, the network interface 306 allows the flight domain logic 302 to communicate with the network 112 through the firewall 121 and network 111 so that the flight domain logic 302 can receive from and transmit data to external sources, e.g., 118-120 (FIG. 1A).

In operation, the flight domain logic 302 controls flight of the aircraft by communicating with the various flight subsystems on the aircraft. While operating, the flight domain logic 302 may receive a signal from the monitoring system 109 (FIG. 1A) to reboot because the contents of the memory 305 have changed from its initial state. Upon receipt of the signal from the monitoring system 109, the flight domain logic 302 reboots and restarts the flight server 201 based upon data stored in the flight domain data 305. When the flight domain logic 302 reboots the flight server 201, the flight domain logic 302 further erases cache memory. Such erasure ensures that offending data and/or signals do not reach the rebooting weapons server 202.

Figure 4:
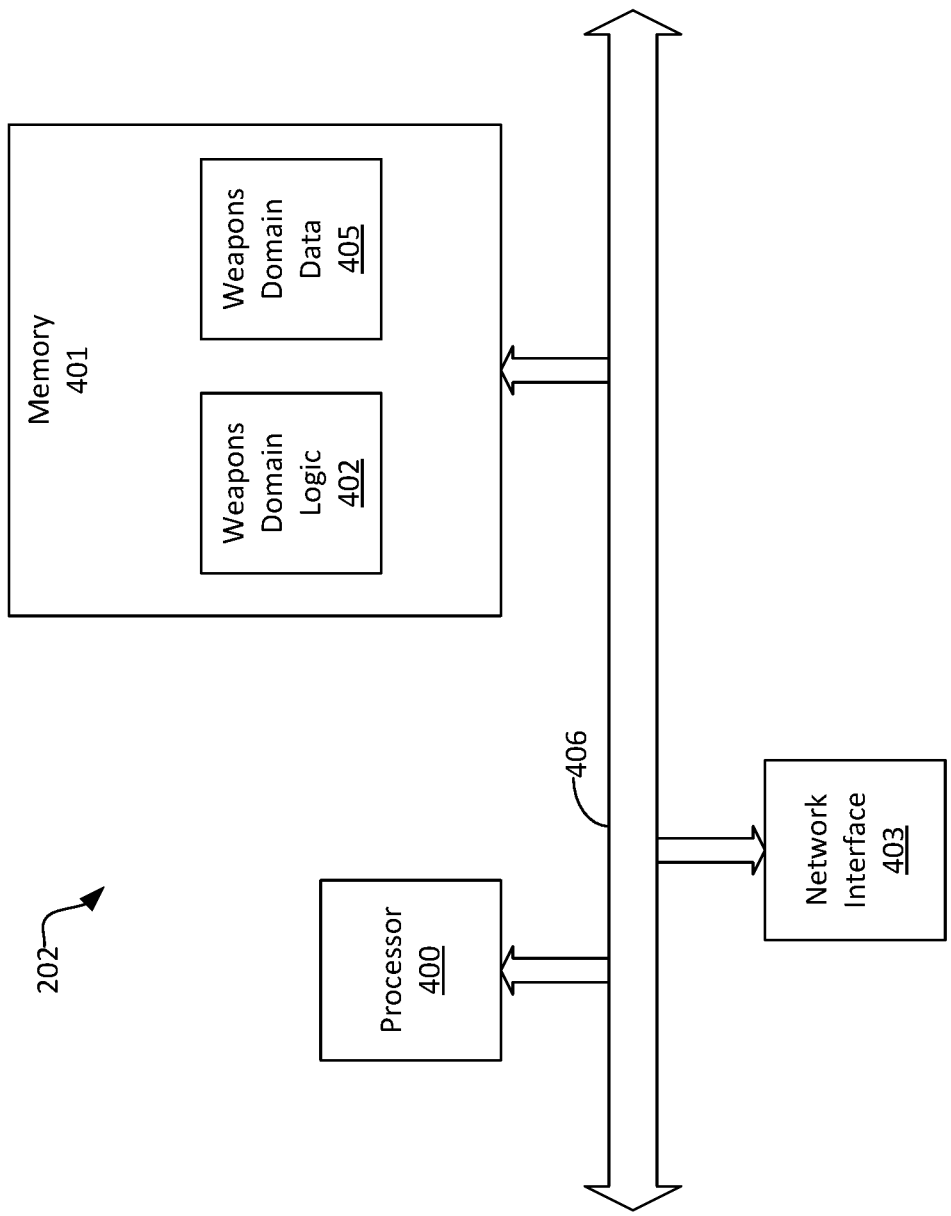
FIG. 4 is a block diagram of an exemplary weapons server of the exemplary primary system as shown in FIG. 2

FIG. 4 depicts an exemplary embodiment of the weapons server 202 depicted in FIG. 2. The weapons server 202 comprises a processor 400, a network interface 406, and memory 401. Stored in memory 401 is weapons domain logic 402 and weapons domain data 405.

Note that memory 401 is any type of memory known in the art and future developed. The memory 401 represents primary memory and secondary memory. For example, memory 401 may include secondary memory, such as random-access memory (RAM) (not shown) or read only memory (ROM) (not shown). Additionally, the memory 401 may include a hard drive (not shown) or solid-state storage or other storage devices (SD) (not shown). Memory 401 may also include cache.

The exemplary embodiment of the weapons server 202 depicted by FIG. 4 comprises at least one conventional processor 400, such as a Digital Signal Processor (DSP) or a Central Processing Unit (CPU), that communicates to and drives the other elements within the weapons server 202 via a local interface 406, which can include at least one bus. Further, the processor 400 is configured to execute instructions of software, such as the weapons domain logic 402.

The weapons domain logic 402 generally controls the functionality of the weapons server 202, as will be described in more detail hereafter. It should be noted that the weapons domain logic 802 can be implemented in software, hardware, firmware or any combination thereof. In an exemplary embodiment illustrated in FIG. 4, the weapons domain logic 402 is implemented in software and stored in memory 401.

Note that the weapons domain logic 402, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The weapons domain logic 402 controls the weapons systems of the aircraft (not shown), which is described herein. In this regard, the weapons domain logic 402 transmits data necessary for controlling computer-aided weapons such as precision guided rockets, Hellfire missiles, thirty-millimeter chain guns, or any future weapons and offense/defense capabilities. Further, the weapons domain logic 402 may receive data from weapon subsystems that the weapons domain logic 402 uses in controlling the weapon systems or subsystems.

The weapons domain data 405 is any data accessible by the weapons domain logic 402, which enables the weapons domain logic 402 to control weapons on the aircraft. Further, the weapons domain data 405 may be any data that can be used by the weapons domain logic 402 to reboot the weapons server 202 when the weapons server 202 is compromised. Also, the weapons domain data 405 comprises data about the weapons server 202, including file count, file size, or other data related to system state.

The network interface 406 is any type of network interface that allows the weapons domain control logic 402 to communicate with the network 111 (FIG. 1B) through the firewall 121 (FIG. 1). Through the network interface 111, the weapons domain logic 402 can communicate with the flight server 201 or the communications server 203. Through the network interface 406, the weapons domain logic 402 can also communicate with the domains 106-108 on the mirror system 102. Also, the network interface 406 allows the weapons domain logic 402 to communicate with the network 112 through the firewall 121 and network 111 so that the weapons domain logic 402 can receive from and transmit data to external sources, e.g., 118-120 (FIG. 1A).

In operation, the weapons domain logic 402 controls weapons systems and subsystems on the aircraft. While operating, the weapons domain logic 402 may receive a signal from the monitoring system 109 (FIG. 1A) to reboot because the contents of the memory 401 have changed from its initial state. Upon receipt of the signal from the monitoring system 109, the weapons domain logic 402 will reboot and restart the weapons server 202 based upon data stored in the weapons domain data 405. When the weapons domain logic 402 reboots the weapons server 202, the weapons domain logic 402 further erases its cache memory.

Figure 5:
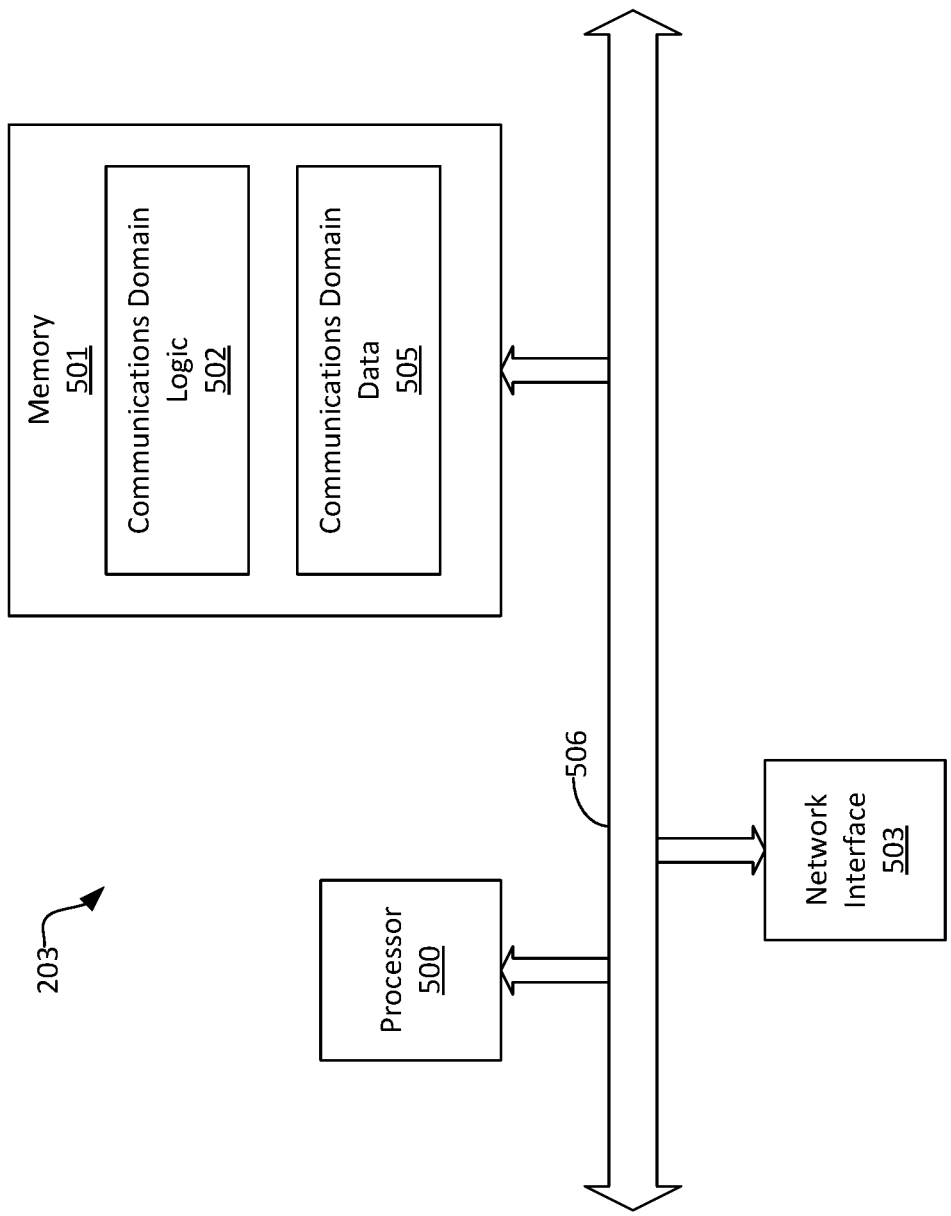
FIG. 5 is a block diagram of an exemplary communications server of the exemplary primary system as shown in FIG. 2.

FIG. 5 depicts an exemplary embodiment of the communications server 203 depicted in FIG. 2. The communications server 203 comprises a processor 500, a network interface 503, and memory 501. Stored in memory 501 is communications domain logic 502 and communications domain data 505.

Note that memory 501 is any type of memory known in the art and future developed. The memory 501 represents primary memory and secondary memory. For example, memory 501 may include secondary memory, such as random-access memory (RAM) (not shown) or read only memory (ROM) (not shown). Additionally, the memory may include a hard drive (not shown) or solid-state storage or other storage devices (SD) (not shown). Memory 501 may also include cache.

The exemplary embodiment of the communications server 203 depicted by FIG. 5 comprises at least one conventional processor 500, such as a Digital Signal Processor (DSP) or a Central Processing Unit (CPU), that communicates to and drives the other elements within the communications server 203 via a local interface 506, which can include at least one bus. Further, the processor 900 is configured to execute instructions of software, such as the communications domain logic 502.

The communications domain logic 502 generally controls the functionality of the communications server 203, as will be described in more detail hereafter. It should be noted that the communications domain logic 502 can be implemented in software, hardware, firmware or any combination thereof. In an exemplary embodiment illustrated in FIG. 5, the communications domain logic 502 is implemented in software and stored in memory 501.

Note that the communications domain logic 502, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The communications domain logic 502 controls the communications between the network 112 and other subsystems on the aircraft (not shown), which is described herein. In this regard, the communications domain logic 502 receives data from external sources or from other servers 201 and 202 transmits data necessary for controlling what data is transmitted to the servers 201 and 202.

The communications domain data 505 is any data accessible by the communications domain logic 502, which enables the communications domain logic 502 to control communications between components on the aircraft or communication to the weapons server 202 or the flight server 201. Further, the communications domain data 505 may be any data that can be used by the communications domain logic 502 to reboot the communications server 203 when the communications server 203 is compromised. Also, the communications domain data 505 comprises data about the communications server 203, including file count, file size, or other data related to system state.

The network interface 503 is any type of network interface that allows the communications domain logic 502 to communicate with the network 111 (FIG. 1B) through the firewall 121 (FIG. 1). Through the network interface 111, the communications domain logic 502 can communicate with the flight server 201 or the weapons server 202. Through the network interface 503, the communications domain logic 502 can also communicate with the domains 106-108 on the mirror system 102. Also, the network interface 503 allows the communications domain logic 502 to communicate with the network 112 through the firewall 121 and network 111 so that the communications domain logic 502 can receive from and transmit data to external sources, e.g., 118-120 (FIG. 1A).

In operation, the communications domain logic 502 controls communication with systems and subsystems on the aircraft and controls communications with the flight server 201 and the weapons server 202. While operating, the communications domain logic 502 may receive a signal from the monitoring system 109 (FIG. 1A) to reboot because the contents of the memory 501 have changed from its initial state. Upon receipt of the signal from the monitoring system 109, the communications domain logic 502 will reboot and restart the communications server 203 based upon data stored in the communications domain data 505. When the communications domain logic 502 reboots the communications server 203, the communications domain logic 502 further erases its cache memory.

Figure 6:
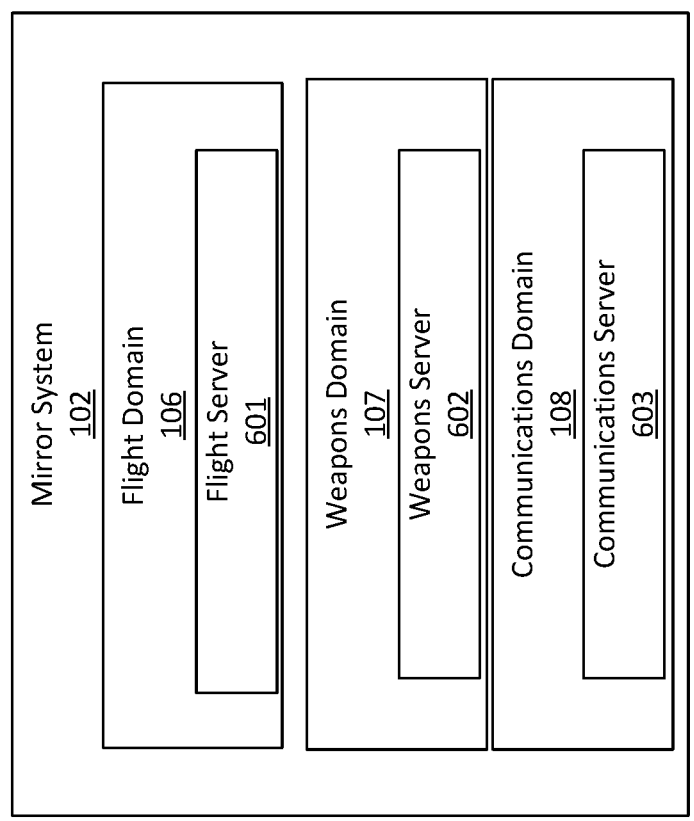
FIG. 6 is a block diagram of an exemplary mirror system as shown in FIG. 1A installed on the aircraft.

FIG. 6 is a block diagram depicting the mirror system 102. As described hereinabove, the mirror system 102 comprises a flight domain 106, a weapons domain 107, and a communications domain 108. The domains 106-108 of the mirror server 102 intra-communicate. That is, during operation of the flight management system 100 (FIG. 1), the flight domain 106 bi-directionally communicates with the weapons domain 107 and the communications domain 108, the weapons domain 107 bi-directionally communicates with the flight domain 106 and the communications domain 108, and the communications domain 108 bi-directionally communications with the flight domain 106 and the weapons domain 107.

In one embodiment, each domain comprises a server or other computing device. In this regard, the flight domain 106 comprises a flight server 601. The weapons domain 107 comprises a weapons server 602, and the communications domain 108 comprises a communications server 603. Note that in another embodiment the flight domain 106, the weapons domain 107, and the communications domain 108 may be implemented on fewer or more servers in other embodiments.

As described above, the flight domain 106 controls the actual flight of the aircraft, and the flight domain 106 is the most essential domain. It receives and transmits data necessary for flying the aircraft. In this regard, it may control any subsystem that causes the aircraft to climb, descend, turn left, turn right, bank left, bank right, pitch, roll or yaw.

In one embodiment of the flight management system 100, the flight server 601 comprises hardware (not shown), including memory for storing software (not shown) and other data. The flight server 601 is configured to bi-directionally communicate with the weapons server 602 and the communications server 603 through the firewall 121 (FIG. 1B) or bi-directionally communicate with an external source through the network 112 (FIG. 1A) and the firewall 110 (FIG. 1A). The hardware includes a hard drive (not shown) for storing control software and/or files and data for controlling flight of the aircraft. This data may include data indicative of changes to the state of the hard drive so that when the flight server 601 is rebooted when the flight server 601 is compromised, the flight server 601 can return to an initial state. The initial state means all data that may have been compromised is replaced with data that replicates the data initially on the flight server 601.

As described above, the weapons domain 107 controls any type of weapons solution implemented on the aircraft that uses computer processing. For example, the weapons domain may control precision guided rockets, Hellfire missiles, a thirty-millimeter chain guns, or any future weapons and offense/defense capabilities. It receives and transmits data necessary for controlling weapons (not shown) on the aircraft. In this regard, it may control any subsystem that causes the aircraft to locate a target and activate a weapon. For example, the weapons domain 107 may receive a signal from the communications domain 108 comprising data indicative of a location of the aircraft and the location of a target. Further, the weapons domain 107 may transmit data to a weapons subsystem to activate a weapon aimed at the target received in the data from the communications domain 108.

In one embodiment of the flight management system, the weapons server 602 comprises hardware (not shown), including memory for storing software (not shown) and other data. The weapons server 602 is configured to bi-directionally communicate with the flight server 601 and the communications server 603 through the firewall 121 (FIG. 1B) or bi-directionally communicate with an external source through the network 112 (FIG. 1A) and the firewall 110 (FIG. 1A). The hardware includes a hard drive (not shown) for storing control software and/or files and data for controlling weapon subsystems on the aircraft. This data may include data indicative of changes to the state of the hard drive so that when the weapons server 602 is rebooted when the weapons server 602 is compromised, the weapons server 602 can return to an initial state. The initial state means all data that may have been compromised is replaced with data that replicates the data initially on the weapons server 602.

As described above, the communications domain 108 domain is the main transceiver of the system. Information that is received from the external source is typically received by the communications domain 108 regardless of its ultimate destination. In this regard, the communications domain 108 often acts as a "gatekeeper" for receiving information and forwarding the data to one of the other domains, including the flight domain 106 and the weapons domain 107. Once data is received, the communications domain 108 determines to which domain, the flight domain 106 or the weapons domain 107, the data should be disseminated. For example, the communications domain may receive a GPS signal that identifies a location of the aircraft. The communication domain would route this data indicative of the GPS signal received to the flight domain. The flight domain uses the data indicative of the signal to fly the aircraft.

In one embodiment of the flight management system, the communications server 603 comprises hardware (not shown), including memory for storing software (not shown) and other data. The communications server 603 is configured to bi-directionally communicate with the flight server 601 and the weapons server 602 through the firewall 121 (FIG. 1B) or bi-directionally communicate with an external source through the network 112 (FIG. 1A) and the firewall 110 (FIG. 1A). The hardware includes a hard drive (not shown) for storing control software and/or files and data for communicating with the other servers, including the flight server 601 and the weapons server 602. This data may include data indicative of changes to the state of the hard drive so that when the communications server 603 is rebooted when the communications server 603 is compromised, the communications server 603 can return to an initial state. The initial state means all data that may have been compromised is replaced with data that replicates the data initially on the communications server 603.

Figure 7:
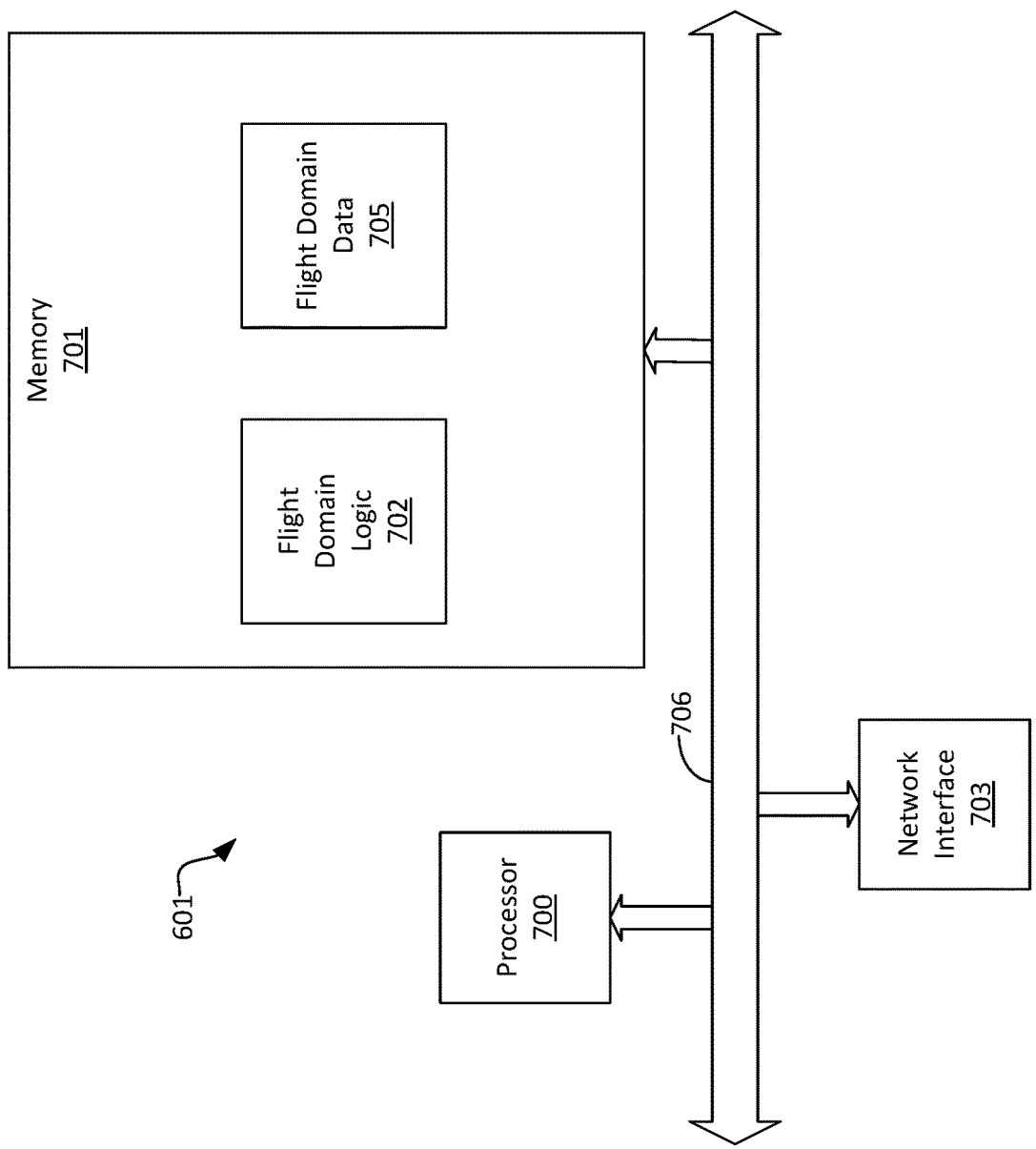
FIG. 7 is a block diagram of an exemplary flight server of the exemplary mirror system as shown in FIG. 6.

FIG. 7 depicts an exemplary embodiment of the flight server 601 depicted in FIG. 6. The flight server 601 comprises a processor 700, a network interface 706, and memory 701. Stored in memory 701 is flight domain logic 702 and flight domain data 705.

Note that memory 701 is any type of memory known in the art and future developed. The memory 701 represents primary memory and secondary memory. For example, memory 701 may include secondary memory, such as random-access memory (RAM) (not shown) or read only memory (ROM) (not shown). Additionally, the memory 901 may include a hard drive (not shown) or solid-state storage or other storage devices (SD) (not shown). Memory 701 may also include cache.

The exemplary embodiment of the flight server 601 depicted by FIG. 7 comprises at least one conventional processor 700, such as a Digital Signal Processor (DSP) or a Central Processing Unit (CPU), that communicates to and drives the other elements within the flight server 601 via a local interface 706, which can include at least one bus. Further, the processor 700 is configured to execute instructions of software, such as the flight domain logic 702.

The flight domain logic 702 generally controls the functionality of the flight server 601, as will be described in more detail hereafter. It should be noted that the flight domain logic 702 can be implemented in software, hardware, firmware or any combination thereof. In an exemplary embodiment illustrated in FIG. 7, the flight domain logic 702 is implemented in software and stored in memory 701.

Note that the flight domain logic 702, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The flight domain logic 702 controls flight of the aircraft (not shown), which is described herein. In this regard, the flight domain logic 702 transmits data necessary for flying the aircraft to flight subsystems of the aircraft. Further, the flight domain logic 702 may receive data from flight subsystems that the flight domain logic 702 uses to fly the aircraft. Notably, the flight domain logic 702 may control any subsystem that causes the aircraft to climb, descend, turn left, turn right, bank left, bank right, pitch, roll or yaw.

The flight domain data 705 is any data accessible by the flight domain logic 702, which enables the flight domain logic 702 to control flight of the aircraft. Further, the flight domain data 705 may be any data that can be used by the flight domain logic 702 to reboot the flight server 601 when the flight server 601 is compromised. Also, the flight domain data 705 comprises data about the flight server 601, including file count, file size, or other data related to system state.

The network interface 703 is any type of network interface that allows the flight domain control logic 302 to communicate with the network 111 (FIG. 1B) through the firewall 121 (FIG. 1). Through the network interface 111, the flight domain logic 702 can communicate with the weapons server 602 or the communications server 603. Through the network interface 703, the flight domain logic 702 can also communicate with the domains 106-108 on the mirror system 102. Also, the network interface 703 allows the flight domain logic 702 to communicate with the network 112 through the firewall 121 and network 111 so that the flight domain logic 702 can receive from and transmit data to external sources, e.g., 118-120 (FIG. 1A).

In operation, the flight domain logic 702 controls flight of the aircraft by communicating with the various flight subsystems on the aircraft. While operating, the flight domain logic 702 may receive a signal from the monitoring system 109 (FIG. 1A) to reboot because the contents of the memory 705 have changed from its initial state. Upon receipt of the signal from the monitoring system 109, the flight domain logic 702 will reboot and restart the flight server 601 based upon data stored in the flight domain data 705. When the flight domain logic 702 reboots the flight server 601, the flight domain logic 702 further erases cache memory.

Figure 8:
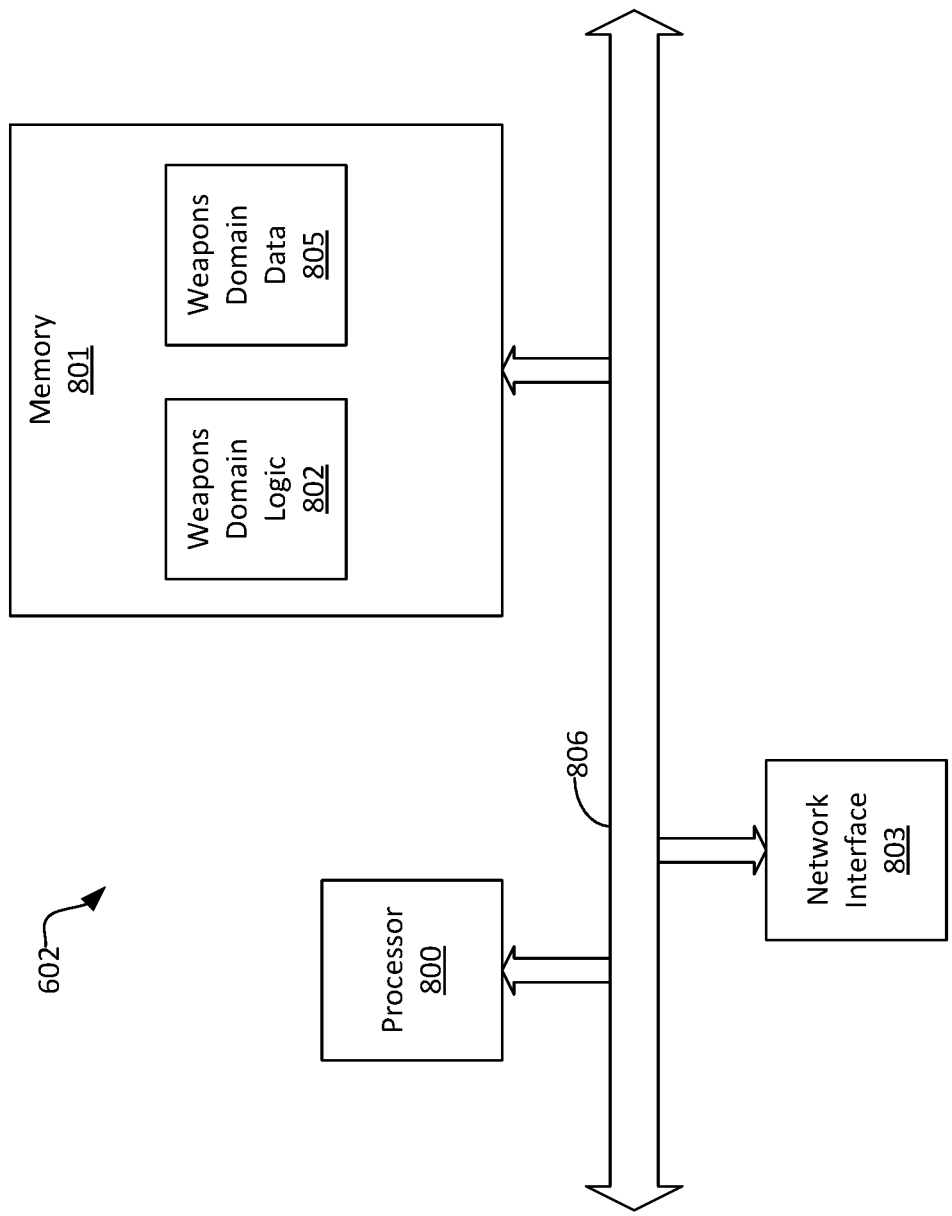
FIG. 8 is a block diagram of an exemplary weapons server of the exemplary mirror system as shown in FIG. 6

FIG. 8 depicts an exemplary embodiment of the weapons server 602 depicted in FIG. 6. The weapons server 602 comprises a processor 800, a network interface 806, and memory 801. Stored in memory 801 is weapons domain logic 802 and weapons domain data 805.

Note that memory 801 is any type of memory known in the art and future developed. The memory 801 represents primary memory and secondary memory. For example, memory 801 may include secondary memory, such as random-access memory (RAM) (not shown) or read only memory (ROM) (not shown). Additionally, the memory 801 may include a hard drive (not shown) or solid-state storage or other storage devices (SD) (not shown). Memory 801 may also include cache.

The exemplary embodiment of the weapons server 602 depicted by FIG. 8 comprises at least one conventional processor 800, such as a Digital Signal Processor (DSP) or a Central Processing Unit (CPU), that communicates to and drives the other elements within the weapons server 602 via a local interface 806, which can include at least one bus. Further, the processor 800 is configured to execute instructions of software, such as the weapons domain logic 802.

The weapons domain logic 802 generally controls the functionality of the weapons server 602, as will be described in more detail hereafter. It should be noted that the weapons domain logic 802 can be implemented in software, hardware, firmware or any combination thereof. In an exemplary embodiment illustrated in FIG. 8, the weapons domain logic 802 is implemented in software and stored in memory 801.

Note that the weapons domain logic 802, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The weapons domain logic 802 controls the weapons systems of the aircraft (not shown), which is described herein. In this regard, the weapons domain logic 802 transmits data necessary for controlling computer-aided weapons such as precision guided rockets, Hellfire missiles, thirty-millimeter chain guns, or any future weapons and offense/defense capabilities. Further, the weapons domain logic 802 may receive data from weapon subsystems that the weapons domain control logic 402 uses in controlling the weapons.

The weapons domain data 805 is any data accessible by the weapons domain logic 802, which enables the weapons domain logic 302 to control flight of the aircraft. Further, the weapons domain data 805 may be any data that can be used by the weapons domain logic 802 to reboot the weapons server 602 when the weapons server 602 is compromised. Also, the weapons domain data 805 comprises data about the weapons server 602, including file count, file size, or other data related to system state.

The network interface 806 is any type of network interface that allows the weapons domain control logic 402 to communicate with the network 111 (FIG. 1B) through the firewall 121 (FIG. 1). Through the network interface 806, the weapons domain logic 802 can communicate with the weapons server 602 or the communications server 603. Through the network interface 806, the weapons domain logic 802 can also communicate with the domains 106-108 on the mirror system 102. Also, the network interface 806 allows the weapons domain logic 802 to communicate with the network 112 through the firewall 121 and network 111 so that the weapons domain logic 802 can receive from and transmit data to external sources, e.g., 118-120 (FIG. 1A).

In operation, the weapons domain logic 802 controls weapons systems and subsystems on the aircraft. While operating, the weapons domain logic 802 may receive a signal from the monitoring system 109 (FIG. 1A) to reboot because the contents of the memory 801 have changed from its initial state. Upon receipt of the signal from the monitoring system 109, the weapons domain logic 802 will reboot and restart the weapons server 602 based upon data stored in the weapons domain data 805. When the weapons domain logic 802 reboots the weapons server 602, the weapons domain logic 802 further erases its cache memory.

Figure 9:
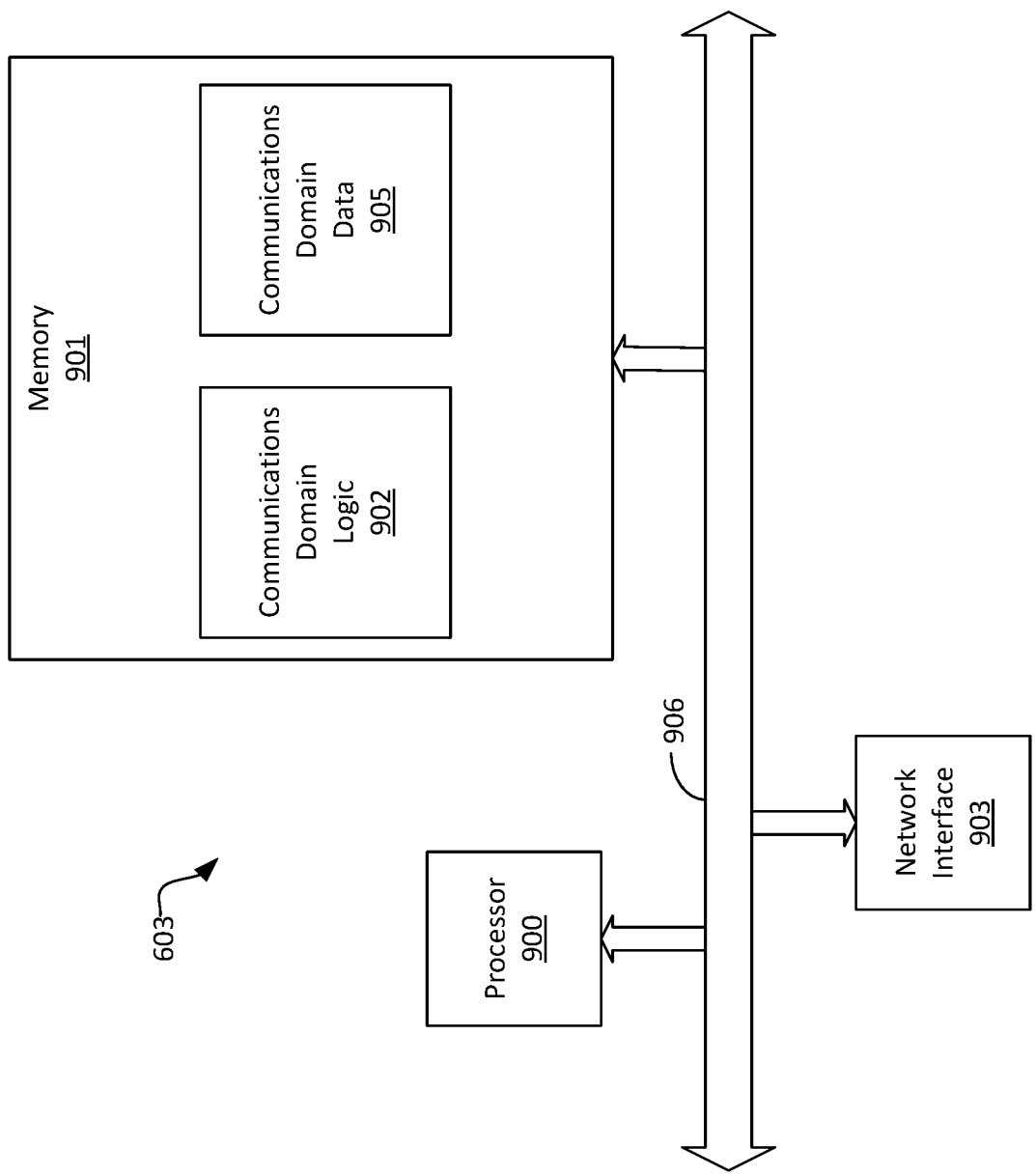
FIG. 9 is a block diagram of an exemplary communications server of the exemplary mirror system as shown in FIG. 6.

FIG. 9 depicts an exemplary embodiment of the communications server 603 depicted in FIG. 6. The communications server 603 comprises a processor 900, a network interface 903, and memory 901. Stored in memory 901 is communications domain logic 902 and communications domain data 905.

Note that memory 901 is any type of memory known in the art and future developed. The memory 901 represents primary memory and secondary memory. For example, memory 901 may include secondary memory, such as random-access memory (RAM) or read only memory (ROM). Additionally, the memory may include a hard drive or solid-state storage or other storage devices (SD). Memory 901 may also include cache.

The exemplary embodiment of the communications server 603 depicted by FIG. 9 comprises at least one conventional processor 900, such as a Digital Signal Processor (DSP) or a Central Processing Unit (CPU), that communicates to and drives the other elements within the communications server 603 via a local interface 906, which can include at least one bus. Further, the processor 900 is configured to execute instructions of software, such as the communications domain logic 902.

The communications domain logic 902 generally controls the functionality of the communications server 603, as will be described in more detail hereafter. It should be noted that the communications domain logic 902 can be implemented in software, hardware, firmware or any combination thereof. In an exemplary embodiment illustrated in FIG. 9, the communications domain logic 902 is implemented in software and stored in memory 901.

Note that the communications domain logic 902, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The communications domain logic 902 controls the communications between the network 112 and other subsystems on the aircraft (not shown), which is described herein. In this regard, the communications domain logic 902 receives data from external sources or from other servers 601 and 602 and transmits data necessary for controlling what data is transmitted to the servers 601 and 602.

The communications domain data 905 is any data accessible by the communications domain logic 902, which enables the communications domain logic 902 to control communications between components on the aircraft or communication to the weapons server 602 or the flight server 601. Further, the communications domain logic 905 may be any data that can be used by the communications domain logic 902 to reboot the communications server 603 when the communications server 603 is compromised. Also, the communications domain data 905 comprises data about the communications server 603, including file count, file size, or other data related to system state.

The network interface 903 is any type of network interface that allows the communications domain logic 902 to communicate with the network 111 (FIG. 1B) through the firewall 121 (FIG. 1). Through the network interface 111, the communications domain logic 902 can communicate with the flight server 601 or the weapons server 602. Through the network interface 903, the communications domain logic 902 can also communicate with the domains 106-108 on the mirror system 102. Also, the network interface 903 allows the communications domain logic 902 to communicate with the network 112 through the firewall 121 and network 111 so that the communications domain logic 902 can receive from and transmit data to external sources, e.g., 118-120 (FIG. 1A).

In operation, the communications domain logic 902 controls communication with systems and subsystems on the aircraft and controls communications with the flight server 601 and the weapons server 602. While operating, the communications domain logic 902 may receive a signal from the monitoring system 109 (FIG. 1A) to reboot because the contents of the memory 901 have changed from its initial state. Upon receipt of the signal from the monitoring system 109, the communications domain logic 902 will reboot and restart the communications server 603 based upon data stored in the communications domain logic 905. When the communications domain logic 902 reboots the communications server 603, the communications domain logic 902 further erases its cache memory.

Figure 10:
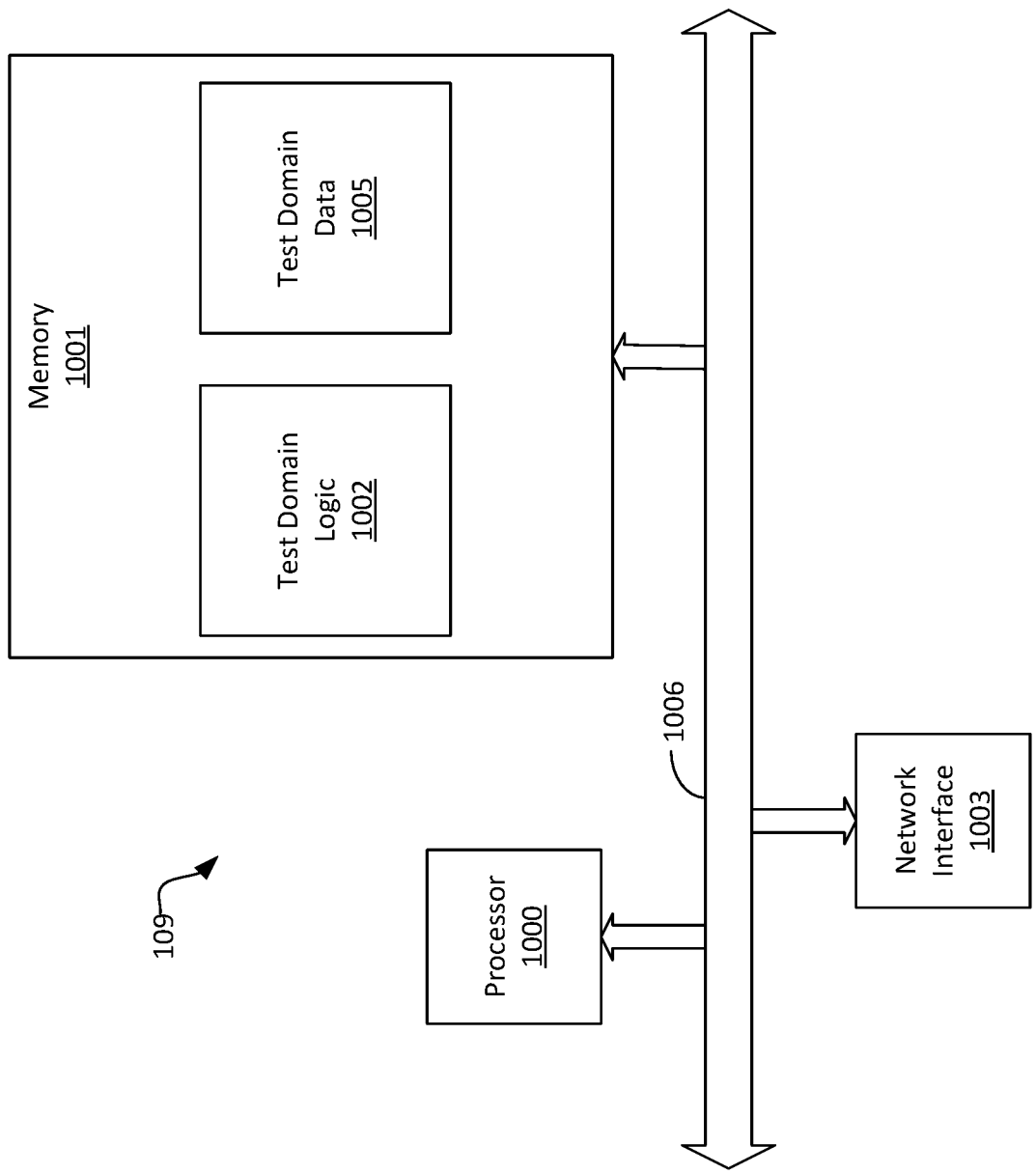
FIG. 10 is a block diagram of an exemplary monitoring system as shown in FIG. 1A.

FIG. 10 is a block diagram of an exemplary monitoring system 109 as shown in FIG. 1A. The monitoring system 109 comprises a processor 1000, a network interface 1003, and memory 1001. Stored in memory 1001 is test domain logic 1002 and test domain data 1005.

Note that memory 1001 is any type of memory known in the art and future developed. The memory 1001 represents primary memory and secondary memory. For example, memory 1001 may include secondary memory, such as random-access memory (RAM) (not shown) or read only memory (ROM) (not shown). Additionally, the memory 1001 may include a hard drive (not shown) or solid-state storage or other storage devices (SD) (not shown).

The exemplary embodiment of the monitoring system 109 depicted by FIG. 10 comprises at least one conventional processor 1000, such as a Digital Signal Processor (DSP) or a Central Processing Unit (CPU), that communicates to and drives the other elements within the monitoring system 109 via a local interface 1006, which can include at least one bus. Further, the processor 1000 is configured to execute instructions of software, such as the test domain logic 1002.

The test domain logic 1002 generally control the functionality of the monitoring system 109, as will be described in more detail hereafter. It should be noted that the test domain logic 1002 can be implemented in software, hardware, firmware or any combination thereof. In an exemplary embodiment illustrated in FIG. 10, the test domain logic 1002 is implemented in software and stored in memory 1001.

Note that the test domain logic 1002, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The network interface 1003 is any type of network interface that allows the test domain logic 1002 to communicate with the network 111 (FIG. 1B) through the firewall 121 (FIG. 1i). Through the network interface 111, the test domain logic 1002 can communicate with the communication server 203, the weapons server 202, the flight server 201, the flight server 601, the test domain logic server 203, or the weapons server 602. Through the network interface 1003, the test domain logic 1002 can transmit messages periodically or constantly to the servers 201-203 an 601-603 obtaining from the servers 201-203 and 601-603 data indicative of file count, file size, and system state. The data may also include data indicative of dates on file and version numbers on files.

The test domain logic 1002 periodically or continuously monitors the flight domains 103 and 106, the weapons domains 104 and 107, and the communications domains 105 and 108. In this regard, the test domain logic 1002 is monitoring the flight servers 201 and 601, the weapons servers 202 and 602, and the communications servers 203 and 603. The test domain logic 1002 monitors the servers 201-203 and 601-603 over the network 111 (FIG. 1A) via the network interface 1003. In monitoring the servers 201-203 and 601-603, the test domain logic 1002 may periodically or continuously request data from the servers 201-203 and 601-603 that indicates whether the state of the servers 201-203 and 601-603 has been corrupted.

The test domain data 1005 is any data accessible by the test domain logic 1002, which enables the test domain logic 1002 to determine whether a server 201-203 or 601-603 has been compromised. Further, the test domain data 1005 may be any data that can be used by the test domain logic 1002 to reboot the servers 201-203 and 601-602 when the test domain logic has determined that the server(s) 201-203 and 601-603 are compromised. The test domain data 1005 may includes data indicative of the initial state of the file counts, the file sizes or the system states of the servers 201-203 and 601-603.

In operation, the monitoring system 109 periodically or continuously requests and/or receives data indicative of the file size, file count, file dates, and version numbers from each of the servers 201-203 and 601-603. Upon receipt, the monitoring system 109 compares the data received from each of the servers 201-203 and 601-603 with the corresponding data stored as the test domain data 1005.

If the data received from the servers 201-203 and 601-603 differs from the static data stored as test domain data 1005 in memory 1001, the test domain logic 1002 sends a data indicative of a message to the domain-under-test that appears to have been infiltrated mandating that the domain that appears to have been infiltrated to shut down and reboot. Simultaneously therewith, the test domain logic 1002 transmits data indicative of a message to the domain mirroring the infiltrated domain begin operating. Notably, the domain mirroring the infiltrated domain is on active standby ready to operate in place of the failed domain. Upon failover to the mirror domain in the mirror system 102, the test monitoring system 109 transmits data to the alert system 113 indicating that a failover has occurred. The alert system 113 transmits data indicative of the failover to the aircrew in the cockpit. As described herein, this may be a message on a liquid crystal display (LCD), a light, or a sound. After one failover, the aircrew need not make a change to his mission.

After one failover, the test domain logic 1002 continues to periodically or continuously monitor the servers 201-203 and 601-603. If the data received from the servers 201-203 and 601-603 differs from the static data stored as test domain data 1005 in memory 1001, the test domain logic 1002 sends data indicative of a message to the domain that appears to have been infiltrated indicating that the domain shut down and reboot. Simultaneously therewith, the test domain logic 1002 transmits data indicative of a message to the domain mirroring the infiltrated domain to boot up and operate in place of the primary domain that has been infiltrated. This domain continues to operate until another failover occurs for that domain. Upon failover to by mirror domain in the mirror system 102 that is operating, the test domain logic 1002 sends a data indicative of a message to the mirror domain, i.e., the domain under test, that appears to have been infiltrated mandating that the domain shut down and reboot. Simultaneously therewith, the test domain logic 1002 transmits data indicative of a message to the corresponding domain in the primary system 101 mirroring the infiltrated domain to start and operate in place of the domain in the mirror system 102. Upon failover to the primary system domain in the primary system 101, the test monitoring system 109 transmits data to the alert system 113 indicating that a failover has occurred again. The alert system 113 transmits data indicative of the failover to the aircrew in the cockpit. As described herein, this may be a message on a liquid crystal display (LCD), a light, or a sound. After a second failover, the aircrew may desire to land as soon as practical.

If a third failover occurs from the primary system 101 to the mirror system 102 again for the same domain, the test monitoring system 109 turns off the infiltrated domain, reboots the mirror domain, and transmits data to the alert system 113 indicating that a failover has occurred a third time for the domain infiltrated. The alert system 113 transmits data indicative of the third failover to the aircrew in the cockpit. After a third failover, the aircrew may desire to land as soon as possible.

If this occurs, the monitoring system 109 transmits a message to the alert system 113. The alert system 113 provides an output to the aircrew in the cockpit indicating that a second failover has occurred. In such a scenario, the aircrew can land as soon as practical.

If, however, a failover occurs a third time, this appears to be a mission critical scenario. In such a case, the aircrew must decide whether to land as soon as possible and scrap the mission.

Figure 11:
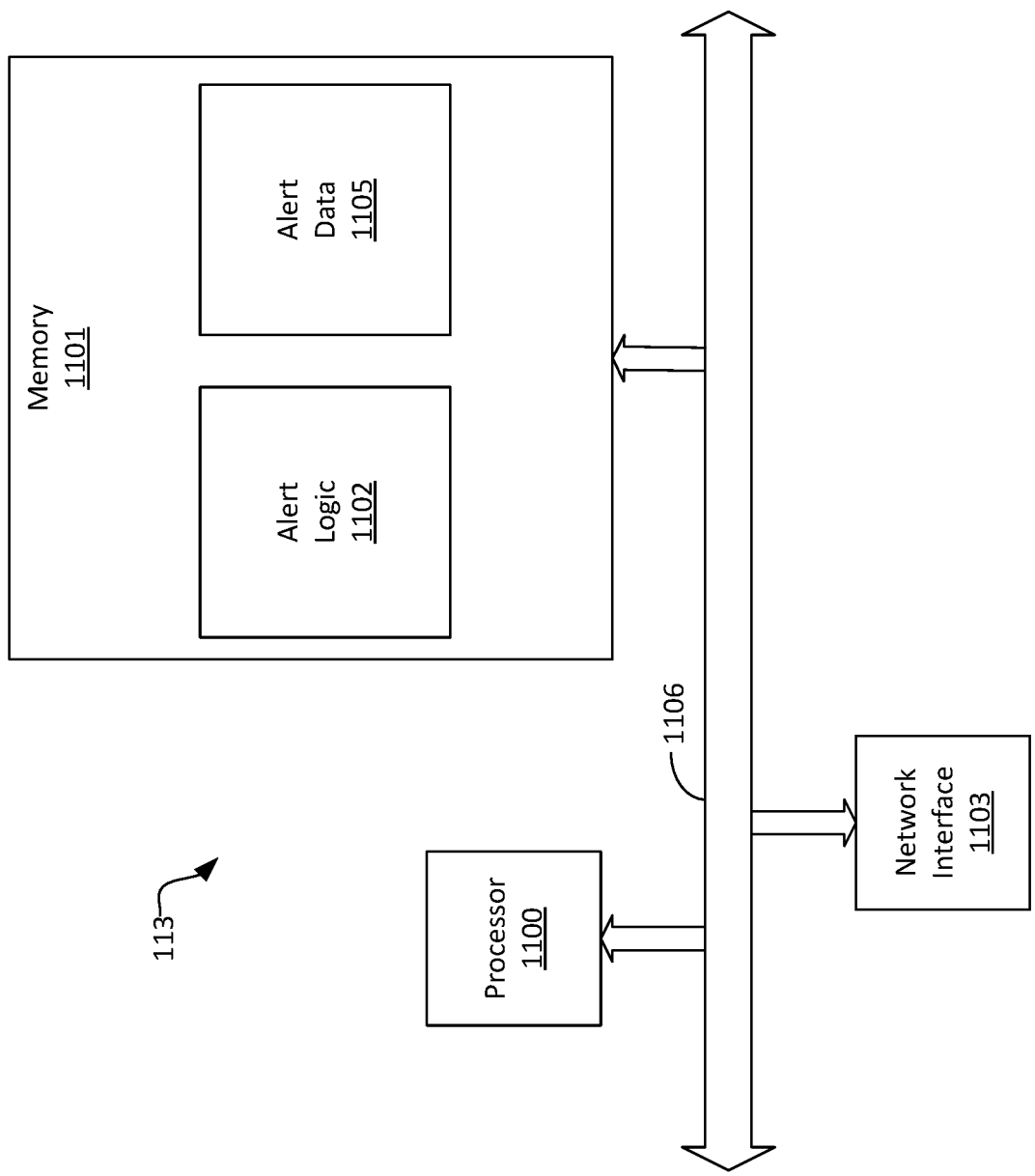
FIG. 11 is a block diagram an exemplary alert system as shown in FIG. 1.

FIG. 11 is a block diagram of an exemplary alert system 113 as shown in FIG. 1A. The alert system 113 comprises a processor 1100, a network interface 1103, and memory 1101. Stored in memory 1101 is alert logic 1102 and alert data 1105.

Note that memory 1101 is any type of memory known in the art and future developed. The memory 1101 represents primary memory and secondary memory. For example, memory 1101 may include secondary memory, such as random-access memory (RAM) (not shown) or read only memory (ROM) (not shown). Additionally, the memory 1101 may include a hard drive (not shown) or solid-state storage or other storage devices (SD) (not shown).

The exemplary embodiment of the alert system 113 depicted by FIG. 11 comprises at least one conventional processor 1100, such as a Digital Signal Processor (DSP) or a Central Processing Unit (CPU), that communicates to and drives the other elements within the alert system 113 via a local interface 1106, which can include at least one bus. Further, the processor 1100 is configured to execute instructions of software, such as the alert logic 1102.

The alert logic 1102 generally control the functionality of the alert system 113, as will be described in more detail hereafter. It should be noted that the alert logic 1102 can be implemented in software, hardware, firmware or any combination thereof. In an exemplary embodiment illustrated in FIG. 11, the alert logic 1102 is implemented in software and stored in memory 1101.

Note that the alert logic 1102, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The network interface 1103 is any type of network interface that allows the alert logic 1102 to communicate with the network 111 (FIG. 1B) through the firewall 121 (FIG. 1). Through the network interface 111, the alert logic 1102 can receive data from the monitoring system 109.

The alert logic 1102 listens on the network 111. If the monitoring system 109 transmits data indicative of a failover, the alert logic 1102 transmits a signal to an output device (not shown) that notifies the aircrew of a failover from one domain to another. As indicated herein, the output device may be, for example an LCD or a speaker. The notification tells the aircrew that a failover has occurred so that the aircrew can take an action, if needed. As described hereinabove, the aircrew may not take any action if only one failover occurs. However, if two or three failovers occur, the aircrew may desire to land the aircraft.

We claim:

1. A flight management system, comprising:

at least six internal domains operating separately characterized by distinct functions on an aircraft, and each having separate hardware and software resources, the six domains configured to connect separately with a specific data exchange to an internal network communicatively coupled to an internal network that is coupled to an external network via a firewall;

a primary system installed on the aircraft, the primary system comprising at least three of the domains, which is initially active, each domain has separate hardware and software resources that are not shared, the primary system comprising a first weapons domain communicating separately with the firewall and communicating data specific to the weapons domain and coupled to the internal network, which is coupled to the external network, a first flight domain communicating separately with the firewall and communicating data specific to the flight domain and coupled to the internal network, which is coupled to the external network, and a first communications domain communicating separately with the firewall and communicating data specific to the communications domain and coupled to the internal network, which is coupled to the external network;
a mirror system installed on the aircraft operating independently and not receiving data until a fail over occurs thereby preserving a state of the primary system on startup, which is initially passive and having separate hardware and software resources not shared with the primary system, the mirror system comprising a second weapons domain communicating separately with the firewall and communicating data specific to the second weapons domain and coupled to the internal network, a second flight domain communicating separately with the firewall and communicating data specific to the second flight domain and coupled to the internal network, and a second communications domain communicating separately with the firewall and communicating data specific to the communications domain and coupled to the internal network;
a monitoring system separate from the primary system and the mirror system and communicatively coupled to the internal network, the monitoring system comprising a processor, the processor configured to identify if a current display of any of the domains is in a state that is not deemed be flight, weapons, or communications worthy, if an image of one or more domains representing a plurality of images of the domains gained from normal operations, the monitoring system comprising a processor, the processor configured to monitor, over the internal network, one or all of the first weapons domain, the first flight domain, or the first communications domain while active, the processor further configured to reboot, over the internal network, one or all of the first weapons domain, the first flight domain, or the first communications domain if the first weapons domain, the first flight domain, or the first communications domain change state, the processor further configured to activate the second weapons domain if the first weapons domain is rebooted, activate the second flight domain if the first flight domain is rebooted, or activate the second communications domain if the first communication domain is rebooted, the second weapons domain may be activated becoming the primary weapons domain receiving specific weapons domain data and the processor reboots the failed over weapons domain making the failed over weapons domain the secondary weapons domain that will not receive data until another fail over thereby preserving the system state, the second flight domain may be activated becoming a primary flight domain receiving specific flight domain data and the processor reboots the failed over flight domain making the failed over flight domain a secondary flight domain that will not receive data until another fail over thereby preserving the system state, and the second communications domain may be activated becoming a primary communications domain receiving specific communications domain data and the processor reboots the failed over communications domain making the failed over communications domain a secondary communications domain that will not receive data until another fail over thereby preserving the system state.

2. The flight management system of claim 1, wherein the monitoring system monitors a file count on a hard drive on the first weapons domain, a hard drive on the first flight domain, and a hard drive on the first communications domain.

3. The flight management system of claim 2, wherein if the file count on one of the hard drives changes compared to a predetermined file count, the processor is configured to activate the second weapons domain, the second flight domain, or the second communications domain based upon the comparison.

4. The flight management system of claim 1, wherein the monitoring system monitors a file size on a hard drive on the first weapons domain, a hard drive on the first flight domain, and a hard drive on the first communications domain.

5. The flight management system of claim 4, wherein if the file size on one of the hard drives changes compared to a predetermined file count, the processor is configured to activate the second weapons domain, the second flight domain, or the second communications domain based upon the comparison.

6. The flight management system of claim 1, wherein the monitoring system monitors source code in memory on the first weapons domain, memory on the first flight domain, and memory on the first communications domain.

7. The flight management system of claim 6, wherein if the source code on one of the hard drives changes compared to a predetermined source code, the processor is configured to activate the second weapons domain, the second flight domain, or the second communications domain based upon the comparison.

8. The flight management system of claim 1, further comprising a firewall communicatively coupled to an external network, the first firewall configured to receive data and metadata from at least one external source and transmit the data and metadata to one of the first or second weapons domains, the first or second flight domains, or the first or second communications domains depending upon which domains are activated and based upon the data and the metadata received.

9. The flight management system of claim 1, further comprising a firewall communicatively coupled to an internal network that is communicatively coupled to the first or second weapons domains, the first or second flight domains, or the first or second communications domains depending upon which domains are activated, the firewall configured to transmit data or metadata to the first or second weapons domains, the first or second flight domains, or the first or second communications domains depending upon which domains are activated.

10. The flight management system of claim 1, further comprising an alert system.

11. The flight management system of claim 10, wherein the alert system comprises a processor configured to receive data from the monitoring system, the data indicative of one of the first or second weapons domains, the first or second flight domains, or the first or second communications domains have been rebooted.

12. The flight management system of claim 11, wherein the alert system processor is further configured to transmit data to an output device indicating that one or more of the first or second weapons domains, the first or second flight domains, or the first or second communications domains have been rebooted.

13. The flight management system of claim 12, wherein the output device is a liquid crystal display.

14. The flight management system of claim 13, wherein the output device is a speaker that produces a sound.

15. The flight management system of claim 14, further comprising a switch for controlling one or more of the first or second weapons domains, the first or second flight domains, or the first or second communications domains have been rebooted.

16. The flight management system of claim 15, wherein the switch is configured to transmit a signal via the network to the monitoring system.

17. The flight management system of claim 16, wherein the monitoring system is configured to reboot one of the first or second weapons domains, the first or second flight domains, or the first or second communications domains depending upon the switch activated by a pilot.

18. The flight management system of claim 1, wherein the external firewall is configured to received external data and/or metadata from external data and/or metadata sources via a routable protocol.

19. The flight management system of claim 18, wherein the routable protocol is transmission control protocol/internet protocol (TCP/IP).

20. The flight management system of claim 18, wherein the firewall is configured to translate the data and/or metadata received via the routable protocol to data and/or metadata in anon-routable protocol that does not contain a network address.

* * * * *